(12) United States Patent
Boulton et al.

(10) Patent No.: US 9,546,044 B2
(45) Date of Patent: Jan. 17, 2017

(54) METHOD AND APPARATUS FOR CAPTURING, STORING, AND DISTRIBUTING STORM WATER

(71) Applicant: Oldcastle Precast, Inc., Auburn, WA (US)

(72) Inventors: J. Brad Boulton, Fort Myers, FL (US); Steve Kingsland, Holly Springs, NC (US)

(73) Assignee: Oldcastle Precast, Inc., Auburn, WA (US)

( * ) Notice: Subject to any disclaimer, the term of this patent is extended or adjusted under 35 U.S.C. 154(b) by 0 days.

(21) Appl. No.: 14/616,111

(22) Filed: Feb. 6, 2015

(65) Prior Publication Data

US 2015/0151914 A1    Jun. 4, 2015

Related U.S. Application Data

(63) Continuation-in-part of application No. 13/372,203, filed on Feb. 13, 2012, now Pat. No. 8,985,897, which is a continuation-in-part of application No. 12/367,186, filed on Feb. 6, 2009, now Pat. No. 8,113,740.

(60) Provisional application No. 61/026,656, filed on Feb. 6, 2008, provisional application No. 61/117,000, filed on Nov. 21, 2008.

(51) Int. Cl.
| | |
|---|---|
| *E02B 11/00* | (2006.01) |
| *B65G 5/00* | (2006.01) |
| *C02F 1/00* | (2006.01) |
| *E03F 1/00* | (2006.01) |
| *E03B 11/14* | (2006.01) |
| *C02F 103/00* | (2006.01) |

(52) U.S. Cl.
CPC ............... *B65G 5/005* (2013.01); *B65G 5/00* (2013.01); *C02F 1/001* (2013.01); *E03B 11/14* (2013.01); *E03F 1/005* (2013.01); *C02F 2103/001* (2013.01); *C02F 2201/002* (2013.01)

(58) Field of Classification Search
CPC .............................. E01C 9/004; F17C 3/005
USPC .............. 405/36, 39, 45, 53, 55; 137/236.1; 220/567.1, 565, 571, 484, 23.4, 601, 661
See application file for complete search history.

(56) References Cited

U.S. PATENT DOCUMENTS

| 39,624 A | 8/1863 | Bainbridge |
|---|---|---|
| 617,991 A | 1/1899 | McDill |

(Continued)

FOREIGN PATENT DOCUMENTS

| EP | 0780524 | 6/1997 |
|---|---|---|
| EP | 1522638 | 4/2005 |

(Continued)

OTHER PUBLICATIONS

FreeFlo Water Recycling Systems home p., as early as Aug. 22, 2006, available at http://www.freeflowater.com/features.html, pp. 1-2, printed on Dec. 2, 2008.

(Continued)

*Primary Examiner* — Sean Andrish
(74) *Attorney, Agent, or Firm* — Sheridan Ross P.C.

(57) ABSTRACT

A precast concrete storm water assembly comprised of a plurality of modular precast concrete components is provided. More specifically, a fluid collection and containment system is provided that comprises a plurality of underground modules and permeable devices, such as ground level pavers, to allow the ingress of fluid at a predetermined rate. Various permeable and non-permeable conduits are also contemplated for conveying fluid within the system.

15 Claims, 24 Drawing Sheets

(56) References Cited

U.S. PATENT DOCUMENTS

| | | |
|---|---|---|
| 1,301,024 A | 4/1919 | Wendelken |
| 1,698,079 A | 1/1925 | Wagner |
| 1,572,887 A | 2/1926 | Dale |
| 1,734,392 A | 11/1929 | Moore |
| 1,860,533 A | 5/1932 | Fredenhagen |
| 2,043,734 A | 12/1933 | Camp |
| 2,147,035 A | 2/1939 | Henderson |
| 2,900,083 A | 9/1956 | Oliver |
| 2,802,339 A | 8/1957 | Fogerty |
| 3,339,366 A | 9/1967 | Gogan et al. |
| 3,579,995 A | 5/1971 | Flynn |
| 3,645,100 A | 2/1972 | La Monica |
| 3,678,637 A | 7/1972 | Klipfel |
| 3,720,022 A | 3/1973 | Dattner |
| 3,742,660 A | 7/1973 | Bierweiler |
| 3,778,528 A | 12/1973 | Heifetz et al. |
| 3,871,146 A | 3/1975 | Hamy |
| 3,878,656 A | 4/1975 | Duwe et al. |
| 3,882,683 A | 5/1975 | Purcell |
| 3,908,324 A | 9/1975 | Stout |
| 3,910,051 A | 10/1975 | Komisarek |
| 3,922,823 A | 12/1975 | King et al. |
| 4,048,772 A | 9/1977 | Gaul |
| 4,050,215 A | 9/1977 | Fisher |
| 4,124,964 A | 11/1978 | Juriss et al. |
| 4,185,429 A | 1/1980 | Mendola |
| 4,194,339 A | 3/1980 | Fisher |
| 4,211,504 A | 7/1980 | Sivachenko |
| 4,220,423 A | 9/1980 | Sivachenko |
| 4,313,692 A | 2/1982 | Johnson |
| 4,314,775 A | 2/1982 | Johnson |
| 4,459,063 A | 7/1984 | Shaw |
| 4,495,131 A | 1/1985 | Del Valle |
| 4,539,780 A | 9/1985 | Rice |
| 4,564,313 A | 1/1986 | Niswander et al. |
| 4,594,024 A | 6/1986 | Jenkner et al. |
| 4,735,234 A | 4/1988 | Matiere |
| 4,761,126 A | 8/1988 | del Valle |
| 4,825,494 A | 5/1989 | King |
| 4,942,708 A | 7/1990 | Krumholz et al. |
| 4,953,280 A | 9/1990 | Kitzmiller |
| 4,969,626 A | 11/1990 | Strauch |
| 4,993,872 A | 2/1991 | Lockwood |
| 5,011,331 A | 4/1991 | Clavarino |
| 5,051,028 A | 9/1991 | Houck et al. |
| 5,103,604 A | 4/1992 | Teron |
| 5,161,912 A | 11/1992 | Schlueter et al. |
| 5,189,855 A | 3/1993 | Williams et al. |
| 5,199,233 A | 4/1993 | Fukutomi et al. |
| 5,199,819 A | 4/1993 | Matiere |
| 5,207,038 A | 5/1993 | Negri |
| 5,243,794 A | 9/1993 | Pikor |
| 5,281,053 A | 1/1994 | Matiere |
| 5,542,780 A | 8/1996 | Kourgli |
| 5,669,194 A | 9/1997 | Colasanto et al. |
| 5,697,736 A | 12/1997 | Veazey et al. |
| 5,759,415 A | 6/1998 | Adams |
| 5,810,510 A | 9/1998 | Urriola |
| 5,875,821 A | 3/1999 | Dumser et al. |
| 5,890,838 A | 4/1999 | Moore, Jr. et al. |
| 5,946,872 A | 9/1999 | Pardo |
| 6,035,585 A | 3/2000 | Boyd |
| 6,092,962 A | 7/2000 | Lee |
| 6,112,935 A | 9/2000 | Shackelford |
| 6,129,838 A | 10/2000 | Millner |
| 6,203,245 B1 | 3/2001 | Harten |
| 6,277,274 B1 | 8/2001 | Coffman |
| D454,203 S | 3/2002 | Bellavance |
| 6,361,248 B1 | 3/2002 | Maestro |
| 6,364,571 B1 | 4/2002 | Doolaege |
| 6,393,774 B1 | 5/2002 | Fisher |
| 6,401,400 B1 | 6/2002 | Elliott |
| 6,422,788 B1 | 7/2002 | Hartman |
| 6,467,995 B2 | 10/2002 | Bevilacqua et al. |
| D465,284 S | 11/2002 | Brown |
| 6,491,473 B2 | 12/2002 | Veazey |
| 6,493,996 B1 | 12/2002 | Alexander et al. |
| 6,648,549 B1 | 11/2003 | Urriola |
| 6,695,544 B2 | 2/2004 | Knudson et al. |
| 6,779,946 B1 | 8/2004 | Urriola et al. |
| 6,939,077 B1 | 9/2005 | Hart |
| 6,942,424 B2 | 9/2005 | Charon |
| 6,962,463 B2 | 11/2005 | Chen |
| 6,991,402 B2 | 1/2006 | Burkhart |
| 7,022,243 B2 | 4/2006 | Bryant |
| 7,080,956 B2 | 7/2006 | Neden et al. |
| 7,131,161 B2 | 11/2006 | Lee |
| 7,160,058 B2 | 1/2007 | Burkhart |
| 7,168,884 B2 | 1/2007 | Hart |
| 7,182,874 B2 | 2/2007 | Allard et al. |
| 7,198,432 B2 | 4/2007 | Chen |
| 7,207,748 B1 | 4/2007 | Urban |
| 7,344,335 B2 | 3/2008 | Burkhart |
| 8,028,713 B2 | 10/2011 | Takai |
| D654,693 S | 2/2012 | Freeman |
| 8,113,740 B2 | 2/2012 | Boulton et al. |
| 8,360,100 B2 | 1/2013 | Burkhart, Sr. et al. |
| 8,985,897 B2 | 3/2015 | Boulton et al. |
| 2005/0262778 A1 | 12/2005 | Allen et al. |
| 2006/0169648 A1 | 8/2006 | Fitzgerald |
| 2007/0031192 A1 | 2/2007 | Murfin |
| 2007/0181197 A1 | 8/2007 | Krichten et al. |
| 2008/0251448 A1 | 10/2008 | Kent |
| 2011/0052318 A1 | 3/2011 | Smith et al. |
| 2012/0111866 A1 | 5/2012 | Freeman |

FOREIGN PATENT DOCUMENTS

| | | |
|---|---|---|
| EP | 1818463 | 8/2007 |
| GB | 944064 | 12/1963 |
| GB | 2014212 | 8/1979 |
| GB | 2084227 | 4/1982 |
| GB | 2124277 | 2/1984 |
| JP | 59-126833 | 7/1984 |
| JP | 4-007432 | 1/1992 |
| JP | 05-263458 | 10/1993 |
| JP | 07-003861 | 1/1995 |
| JP | 07-216970 | 8/1995 |
| JP | 07-252870 | 10/1995 |
| JP | 08-004343 | 1/1996 |
| JP | 08-120746 | 5/1996 |
| JP | 09-125468 | 5/1997 |
| JP | 07-189330 | 7/1997 |
| JP | 10-204968 | 8/1998 |
| JP | 11-178186 | 7/1999 |
| JP | 11-190058 | 7/1999 |
| JP | 2000-008467 | 1/2000 |
| JP | 2001-123519 | 5/2001 |
| JP | 2002-021170 | 1/2002 |
| JP | 2002-138561 | 5/2002 |
| WO | WO 95/12034 | 5/1995 |
| WO | WO 2006/032090 | 3/2006 |

OTHER PUBLICATIONS

"Aquaflow® permeable block paving and SUDS. Formpave", Hanson Website, as early as Jul. 12, 2006, available at http://www.heidelbergcement.com/uk/en/hanson/products/block_paving_and_suds/permeable_paving_and_SUDS/aquaflow_permeable_block_paving_and_suds.htm, pp. 1-2, printed on Jun. 3, 2009.

"Block paving and SUDS. Formpave", Hanson Website, as early as Jul. 12, 2006, available at http://www.heidelbergcement.com/uk/en/hanson/products/block_paving_and_suds/block_paving_and_suds_overview.htm, pp. 1-2, printed on Jun. 1, 2009.

"Demonstration: The Stormsaver Rainwater Harvesting System", Stormsaver website, as early as Jun. 9, 2007, available at http://www.stormsaver.com/default.asp?pid=13, p. 1, printed Jun. 1, 2009.

"Education pack: The Stormsaver Rainwater Harvesting System", Stormsaver website, as early as Jun. 9, 2007, available at http://www.stormsaver.com/default.asp?pid=31, pp. 1-2, printed on Jun. 1, 2009.

(56) References Cited

OTHER PUBLICATIONS

"Features", FreeFlo Water Recycling Systems website, as early as Aug. 22, 2006, available at http://www.freeflowater.com/features.html, pp. 1-2, printed on Dec. 2, 2008.
"Formpave Image Gallery", Hanson Website, as early as Jul. 12, 2006, available at http://www.heidelbergcement.com/uk/en/hanson/products/block_paving_and_suds/formpave_image_gallery.htm, pp. 1-4, printed on Jun. 3, 2009.
"Formpave Q24 Sustainable Urban Drainage System", Hanson website, as early as, available at http://www.heidelbergcement.com/NR/rdonlyres/873FFE50-10CF-4ADE-B5AE-F3A389FE9023/0/q24.pdf, p. 1, printed on Jun. 1, 2009.
"Future water strategy. Formpave", Hanson Website, as early as Jul. 12, 2006, available at http://www.heidelbergcement.com/uk/en/hanson/products/block_paving_and_suds/future_water_strategy.htm, p. 1, printed on Jun. 1, 2009.
"How FreeFlo Water Recycling Systems Work", FreeFlo Water Recycling Systems website, as early as Aug. 22, 2006, available at http://www.freeflowater.com/how_it_works.html, pp. 1-2, printed on Dec. 2, 2008.
"How is a System Designed?" Stormsaver website, as early as Jun. 9, 2007, available at http://www.stormsaver.com/default.asp?pid=2, p. 1, printed on Jun. 1, 2009.
"Installation: The Stormsaver Rainwater Harvesting System", as early as Jun. 9, 2007, available at http://www.stormsaver.com/default.asp?pid=6, p. 1, printed on Jun. 1, 2009.
"Photo Gallery", FreeFlo Water Recycling Systems website, as early as Aug. 22, 2006, available at http://www.freeflowater.com/gallery.html, pp. 1-4, printed on Dec. 2, 2008.
"Precast Concrete Modular Storm Water Detention", StormTrap® website, as early as Mar. 23, 2008, available at http://www.stormtrap.com/, pp. 1-2, printed on Aug. 29, 2007.
"Stormsaver: Rainwater Harvesting in Commercial Buildings", Stormsaver website, as early as Jun. 9, 2007, available at http://www.stormsaver.com/default.asp?pid=7, p. 1, printed on Jun. 1, 2009.
"Stormsaver: Rainwater Harvesting in Housing Developments", Stormsaver website, as early as Jun. 9, 2007, available at http://www.stormsaver.com/default.asp?pid=10, pp. 1-2, printed on Jun. 1, 2009.
"SWPPP for Drivers Stormwater Pollution Prevention Plans", Sierra Ready Mix Website, as early as May 3, 2001, available at http://www.sierrareadymix.com/swpp.htm, pp. 1-2, printed on Nov. 19, 2008.
"The Stormsaver System", Stormsaver website, as early as Jun. 9, 2007, available at http://www.stormsaver.com/default.asp?pid=30, p. 1, printed Jun. 1, 2009.
"The Two-Piece Box Cilvert", Precast Solutions Magazine on precast.org website, as early as Mar. 9, 2007, available at http://www.precast.org/publications/solutions/2006_fall/two_culvert.htm, pp. 1-3, printed on Jun. 1, 2009.
"Water harvesting system components details. Formpave", Hanson Website, as early as Jul. 12, 2006, available at http://www.heidelbergcement.com/uk/en/hanson/products/block_paving_and_suds/water_harvesting/water_harvesting_system_components.htm, pp. 1-2, printed on Jun. 1, 2009.
"Water harvesting system details. Formpave", Hanson Website, as early as Jul. 12, 2006, available at http://www.heidelbergcement.com/uk/en/hanson/products/block_paving_and_suds/water_harvesting/water_harvesting_system_details.htm, p. 1, printed on Jun. 1, 2009.
"Welcome to RainEscape-SE", RainEscape website, as early as 2008, available at http://www.rainescape-se.com/, p. 1, printed on Dec. 2, 2008.
"Welcome to Stormsaver Rainwater Harvesting Systems!", Stormsaver website, as early as Feb. 28, 2004, available at http://www.stormsaver.com/, pp. 1-2, printed on Jun. 1, 2009.
"What Exactly is Rainwater Recovery?", Stormsaver website, as early as Jun. 9, 2007, available at http://www.stormsaver.com/default.asp?pid=25, p. 1, printed on Jun. 1, 2009.
"Potable Water Tanks." HTI Systems, LLC, printed Apr. 19, 2012 from http://www.wedotanks.com/potable-water-tanks.asp.
SPATZ "Reading water authority takes huge underground tank out of service for cleaning." readingeagle.com, Oct. 4, 2008, 3 pages.
Official Action for U.S. Appl. No. 12/367,186, mailed Apr. 14, 2011.
Notice of Allowance for U.S. Appl. No. 12/367,186, mailed Oct. 7, 2011.
Official Action for U.S. Appl. No. 13/372,203, mailed Feb. 25, 2014.
Final Action for U.S. Appl. No. 13/372,203, mailed Aug. 7, 2014, 13 pages.
Notice of Allowance for U.S. Appl. No. 13/372,203, mailed Nov. 14, 2014.

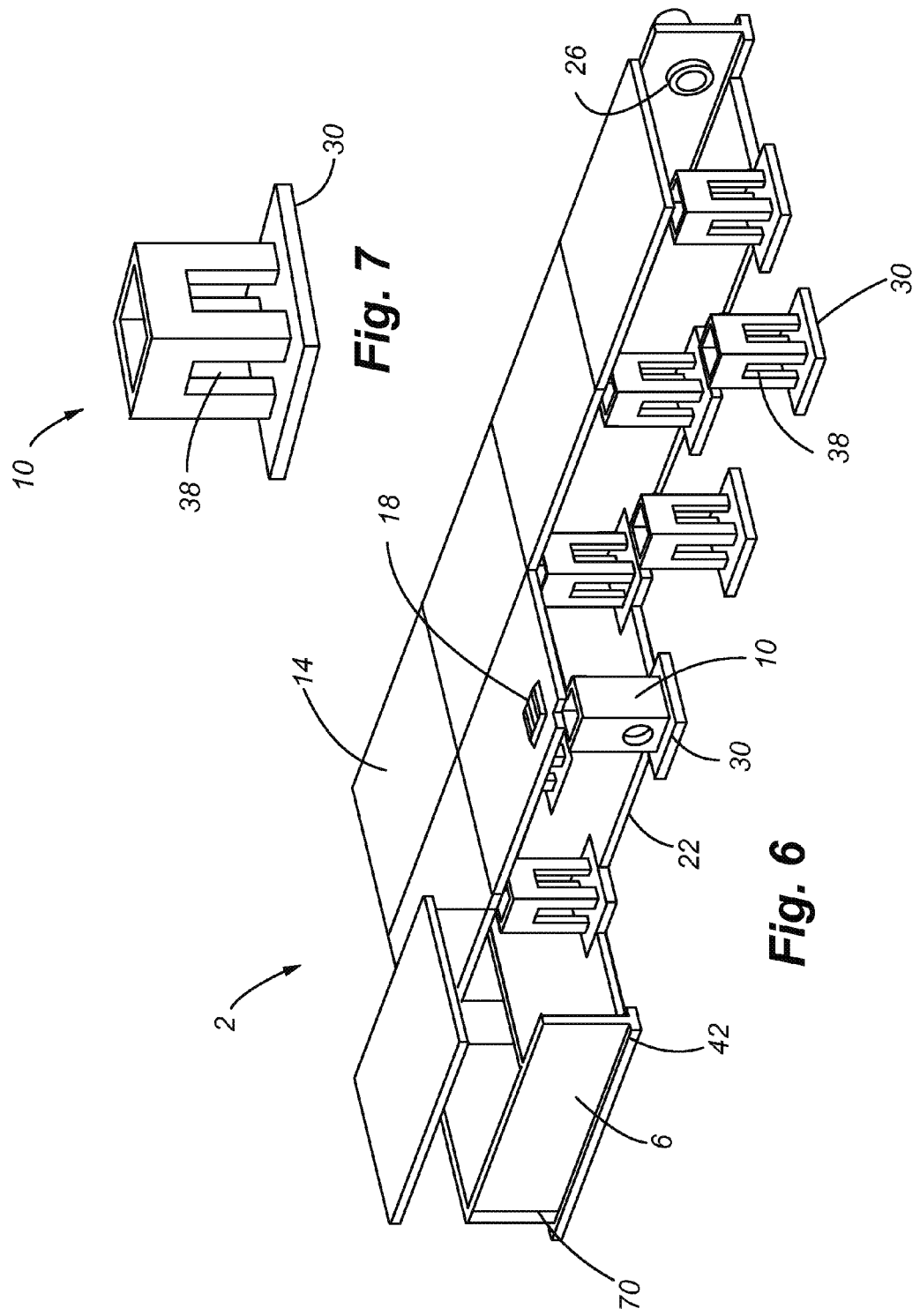

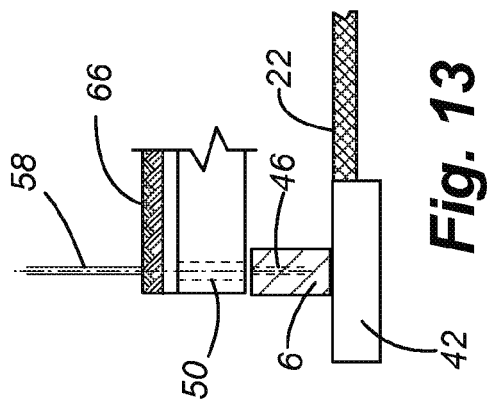
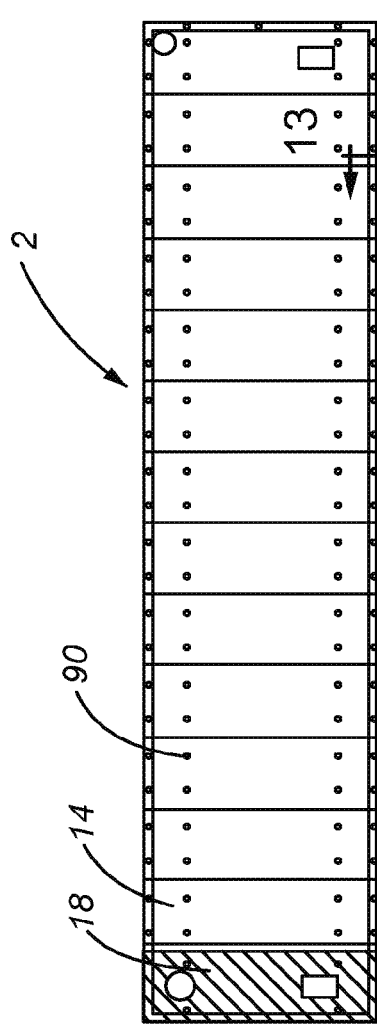
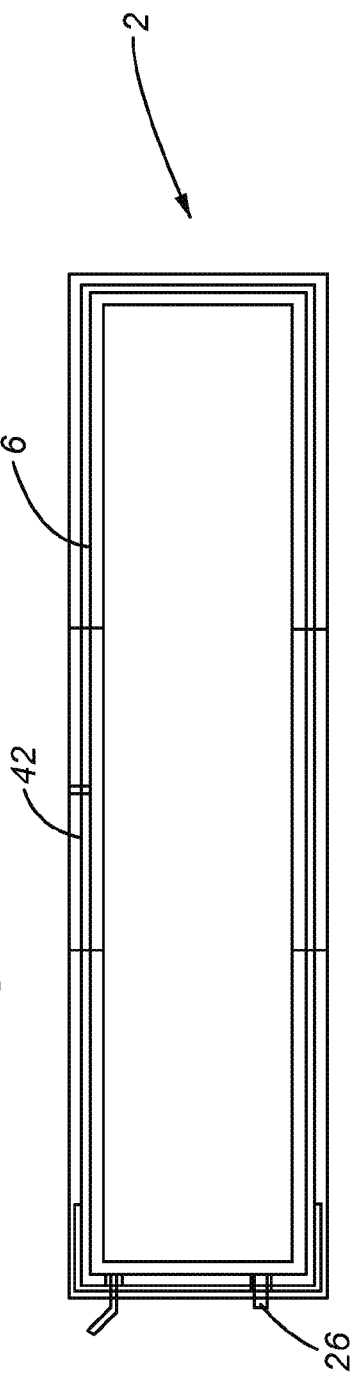
Fig. 13
Fig. 11
Fig. 12

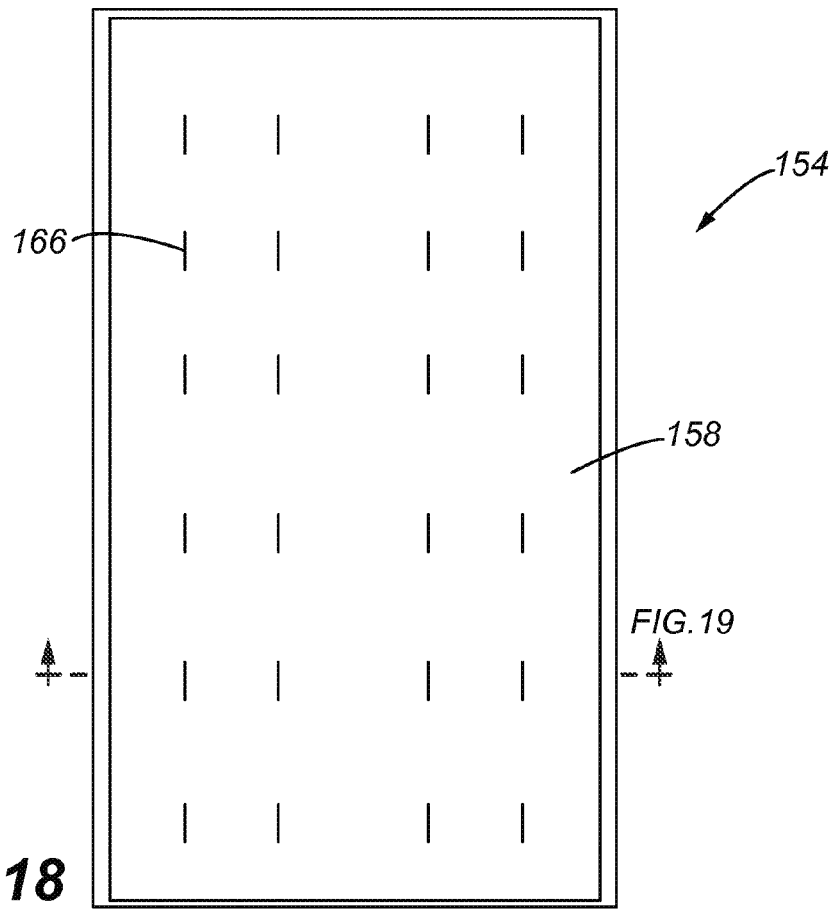
Fig. 18
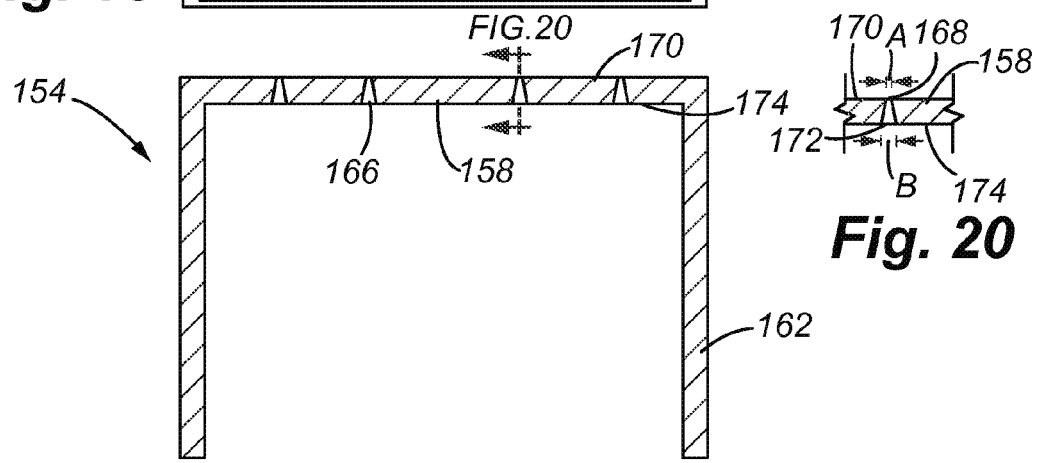
Fig. 19
Fig. 20

METHOD AND APPARATUS FOR CAPTURING, STORING, AND DISTRIBUTING STORM WATER

This application is a Continuation-In-Part of U.S. patent Ser. No. 13/372,203, filed Feb. 13, 2012, which is a Continuation-In-Part of U.S. patent Ser. No. 12/367,186, filed Feb. 6, 2010, which claims the benefit of U.S. Provisional Patent Application Ser. No. 61/026,656 and 61/117,000, filed Feb. 6, 2008 and Nov. 21, 2008, respectfully, the entire disclosures of which are incorporated by reference herein.

FIELD OF THE INVENTION

Embodiments of the present invention are generally related to methods and apparatus for capturing, storing, and distributing storm water. In addition, one embodiment of the present invention employs devices for capturing and treating storm water that is to be used for irrigation, for example.

BACKGROUND OF THE INVENTION

Storm water collection systems are commonly used to capture excess rain and ground water from a variety of surfaces including, paved streets, parking lots, sidewalks, and roofs. Typically, storm water collection systems receive water from street gutters, grates, or drains and vary in size. Conventional storm water collection systems simply gather the excess water and discharge it into a river, lake, canal, reservoir, ocean, dry well, or other recharge basin. Often, however, the amount of water will overwhelm the storm water collection system, which causes backups and localized flooding. Further, due to the scarce availability of water in many arid climates, the retention and use/redistribution of water is becoming a preferable alternative. Thus, it would be advantageous to provide a storm water retention system that prevents flooding and/or storm water waste by treating, storing, and later utilizing the water for other purposes.

SUMMARY OF THE INVENTION

It is one aspect of the present invention to provide a system for capturing, retaining, conveying, and/or treating storm water. More specifically, in one embodiment a storm water vault is provided that includes one or more modular precast components that captures and retains storm water. One embodiment of the present invention is comprised of an exterior perimeter wall having a plurality of columns positioned therein. A plurality of roof panels are also provided and supported by at least the exterior wall and a column. Alternative embodiments omit individual columns and utilize individual vaults which have at least two walls and an integral deck, and which are designed to be used in combination with other individual vaults. The roof panels may include curb details and/or sidewalk details and retention systems to direct or redirect the flow path of water to optimize collection. Alternatively, overlays, such as pavers, permeable pavers, dirt, gravel, asphalt or other materials may be placed above the roof panels, thereby concealing the vault and providing an aesthetic surface. Roof panels preferably include a grate to provide a fluid flow path into the vault. Alternatively, permeable pavers may be used to allow water to ingress into the retention vault.

With respect to the retention system, one embodiment of the present invention employs a plurality of columns to support one or more roof panels of the vault. The columns may be cylindrical, prismatic, or any other practical geometric shape. In addition, the columns may be solid, hollow, or combinations thereof. Hollow columns are desirable due to their reduced weight and have the added benefit of possibly providing a fluid flow path therethrough, which will be described in further detail below. It is envisioned that the columns, walls, and roof panels may be constructed of a precast concrete material.

It is another aspect of the present invention to provide roof panels and/or walls that selectively provide access to the internal portions of the storm water vault. More specifically, access to prior art underground systems is typically gained through a manhole or limited access hatch openings wherein cleaning and equipment installation is limited. Conversely, embodiments of the present invention employ easily removable roof panels that facilitate the access of personnel equipment to improve safety and enhance maintenance. The roof panel can be removable to allow cleaning mechanisms to enter the vault. Such panels may generally include pick points or other known devices to facilitate interconnection with lifting cables or chains. One of skill in the art will appreciate that lifting jacks, for example, may be integrated into the vault that are used to selectively lift the roof panel.

It is another aspect of the present invention to provide a vault associated with a water treatment mechanism. As mentioned above, some of the columns used to support the roof panels may be at least partially hollow that are placed in operable communication with a grate, or other device integrated into the roof panel. As water flows through the grate it will enter the column and discharge through an outlet formed in the column to fill the storm water vault. Thus, some embodiments of the present invention may employ columns with an integrated filtration device. For example, Vortechs® Storm Water Treatment System, which is described in U.S. Pat. No. 5,759,415, and which is incorporated by reference herein, may be used in conjunction with the columns to provide filtration. Flo-Gard® Dual Vortex Hydrodynamic Separator for Storm Water Treatment, which is described in U.S. Pat. No. 7,182,874, which is incorporated by reference herein, may also be employed. A "BaySaver" Storm Water Treatment System or other similar devices may also be used. Embodiments of the present invention may also employ the Jellyfish™ and/or Sorbfilter™ system sold by Imbrium. One of ordinary skill in the art will appreciate that various storm water treatment filtration and particle separation devices may be used in conjunction with various embodiments of the present invention. Such a water treatment device may also be included in numerous other locations within the vault, adjacent to the vault, or may be used in conjunction with the vault.

It is yet another aspect of the present invention to provide a storm water vault that includes additional water quality treatment devices. Embodiments of the present invention may also include sand filters, baffle boxes, oil separators, or other filtering devices known in the art in addition to the particulate filtration devices described above. Embodiments of the present invention also may employ a gravel filter base that may include medias like Sorbtive™ to remove specific pollutants.

It is another aspect of the present invention to provide a storm water vault that is customizable. More specifically, as briefly mentioned above, the components used to construct the storm water vault are preferably made of a precast concrete material. Consequently, the components may be scaled in size and shape to fit any particular building requirement.

It is another aspect of the present invention to provide a storm water vault that may be used in multiple ways. More specifically, one embodiment of the present invention is used for the collection of surface storm water. Yet another embodiment of the present invention is used for groundwater recharge, i.e. exfiltration. Yet another embodiment of the present invention is used for the collection, filtration, or hydrodynamic treatment of the storm water.

It is still yet another aspect of the present invention to provide a system that may be positioned under various overlays. More specifically, some embodiments of the present invention are contemplated to be used with asphalt, gravel, and/or earth, which will be succinctly shown in the figures described below. Other embodiments of the present invention, however, are to be used with pavers or other surface applications that are either permeable or impermeable. That is, a plurality of smaller pavers that allow fluid to drain through or between adjacent pavers may be used independently of or in conjunction with the roof panels. This system may alleviate the need for grating or other mechanisms, wherein fluid accumulates between individual pavers and permeates into the storm water vault via seams, cracks or other mechanisms below the pavers. The overlay may incorporate permeable pavers directly applied to the roof panels or on a gravel overlay. With reference to the latter configuration, the gravel base may incorporate a filter material, such as Sorbtive™ or other media, that specifically targets and absorbs certain pollutants, such as oil, gasoline, phosphorous, nitrogen and other hydrocarbons or chemicals which may leak from parked cars, delivery trucks, etc.

It is another aspect of the present invention to provide a storm water vault that provides storage for future use. More specifically, it is contemplated that the water is stored and/or treated for indefinite periods and subsequently used for irrigation and/or emergency fire protection. One skilled in the art will also appreciate that the storm water vault may be employed as simply as a retention device to prevent flooding, and incorporates a permeable floor to allow for the gradual infiltration of water into the earthen material. Alternatively, the floor may be impermeable and used for storage. This embodiment may include a pumping mechanism for transferring fluid from the vault to an irrigation system, for example. The pumping mechanism also selectively transfers fluid from the vault to prevent overfilling to another vault or location. Accordingly, a fluid level sensing device, such as a float or other mechanical or electrical-mechanical device may be employed wherein the pump will engage if the fluid level within the vault reaches a predetermined level similar to a sump pump. Further embodiments of the present invention include sumps or sump holes.

As mentioned above, one embodiment of the present invention employs a permeable roof to permit storm water to pass into the vault. The permeable lid provides means for directly transporting the storm water into the vault. As water flows through the permeable lid it will enter into and fill the storm water vault. It is also envisioned that at least a portion of the walls be permeable to further facilitate the movement of storm water to the vault.

It is yet another aspect of the present invention to provide a storm water system that stores water for future use and distributes the water to specified destinations. More specifically, a distribution mechanism is provided that may include but is not limited to a storage tank, a filter pump, piping, tubing, or other means for transportation. Once the storm water is treated the water may be stored in a storage tank to be used for a variety of future uses, including irrigation, emergency fire protection, and municipal water source. One skilled in the art will also appreciate that the storm water system may be employed as a temporary retention device to prevent flooding.

It is yet another aspect of embodiments of the present invention to provide a system that is comprised of permeable modules. The modules are comprised of a top surface and associated sidewalls with discreet openings that allow for the ingress of water. The system also includes a filter fabric positioned adjacent to the modules to retain leaves and other debris or contaminants. Further, aggregate material and permeable pavers are placed above the filter fabric to provide a system for capturing water that falls on the pavers. More specifically, water passes through the permeable pavers, the permeable aggregate material, the filter fabric, and through holes or slots incorporated into the top surface and/or sidewalls of the modules. It is also envisioned that the modules may include an impermeable liner for retaining the collected water for future use.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description given below, serve to explain the principles of these inventions.

FIG. 6 is a partial perspective view of the storm water vault of another embodiment of the present invention;

FIG. 7 is a perspective view of a column employed by the storm water vault shown in FIG. 6;

FIG. 11 is a top plan view of a storm water vault of another embodiment of the present invention;

FIG. 12 is a top plan view similar to FIG. 11 wherein the roof panels have been omitted for clarity;

FIG. 13 is a sectional view of FIG. 11 showing the interconnection of the roof panel to the wall;

FIG. 18 is a top plan view of a module of another embodiment of the present invention;

FIG. 19 is a cross section of FIG. 18;

FIG. 20 is a partial cross section of FIG. 19;

Figure 1:
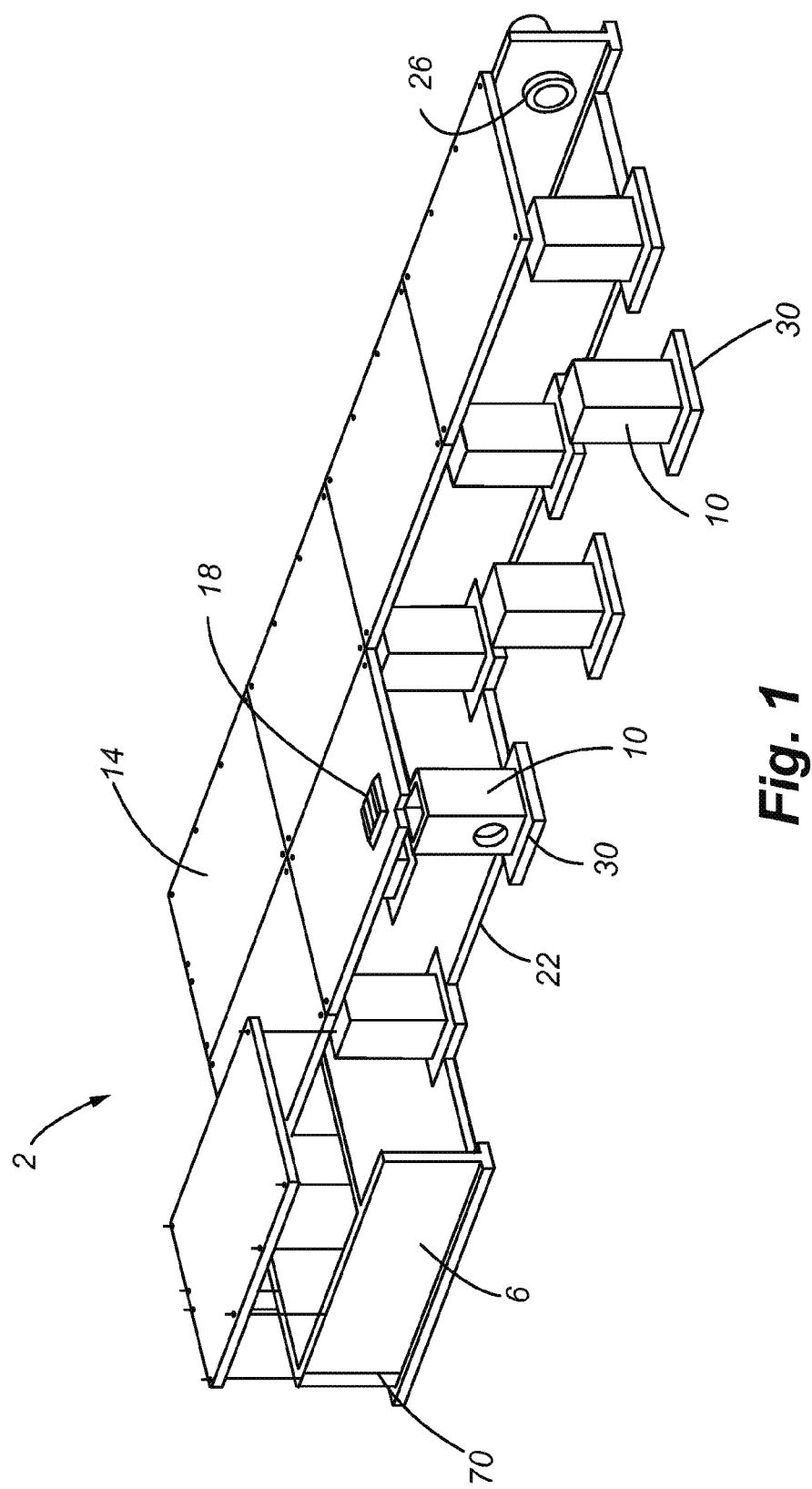
FIG. 1 is a partial perspective view of a storm water vault of one embodiment of the present invention.

To assist in the understanding of the present invention the following list of components and associated numbering found in the drawings is provided herein:

| # | Component |
| --- | --- |
| 2 | Storm water vault |
| 6 | Wall |
| 10 | Support column |
| 14 | Roof panel |
| 18 | Grate |
| 22 | Fill |
| 26 | Inlet/Outlet |
| 30 | Base |
| 34 | Column outlet |
| 38 | Opening |
| 42 | Footer |
| 46 | Hole |
| 50 | Thru hole |
| 54 | Seal member |
| 58 | Dowel |
| 60 | Finished grade |
| 62 | Sealant |
| 66 | Overlay |
| 70 | Joint |
| 74 | Rod |

-continued

| # | Component |
| --- | --- |
| 76 | Sump |
| 78 | Channel |
| 82 | Grout |
| 86 | Wrap |
| 90 | Lift point |
| 98 | Fluid |
| 102 | Permeable pavers |
| 106 | Asphalt |
| 110 | Weep hole |
| 114 | Grate |
| 118 | Permeable lid |
| 122 | Permeable base/materials |
| 126 | Treatment or reuse tank |
| 130 | Reuse line |
| 134 | Manhole |
| 138 | Downspout |
| 142 | Roof |
| 150 | Crosswalk |
| 154 | Module |
| 158 | Roof panel |
| 162 | Sidewall |
| 166 | Flow ports |
| 168 | Upper opening |
| 170 | Top surface |
| 172 | Lower opening |
| 174 | Bottom surface |
| 178 | Window opening |
| 180 | Window |
| 182 | Stone |
| 186 | Casing material |
| 190 | Flo-Cell |
| 194 | Filter fabric |
| 198 | Aggregate material |
| 202 | Pavers |
| 204 | Permeable Pipe |
| 300 | Module |
| 302 | Lateral flow port |
| 304 | Longitudinal flow port |
| 306 | Panel |
| 307 | Void |
| 308 | Panel |
| 310 | Fluid |
| 312 | Seam |
| 314 | Roof portion |
| 320 | Roof port |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 1-10, a storm water vault 2 of one embodiment of the present invention is shown that is comprised of a plurality of walls 6 that define a perimeter shape of a water containment system. A plurality of columns 10 are positioned within the walls 6 and support a plurality of roof panels 14. Some of the columns 10 may be hollow and in fluid communication with a grate 18 for the transportation of water from the roof panel 14 to the water containment system or storm water vaults.

Figure 8:
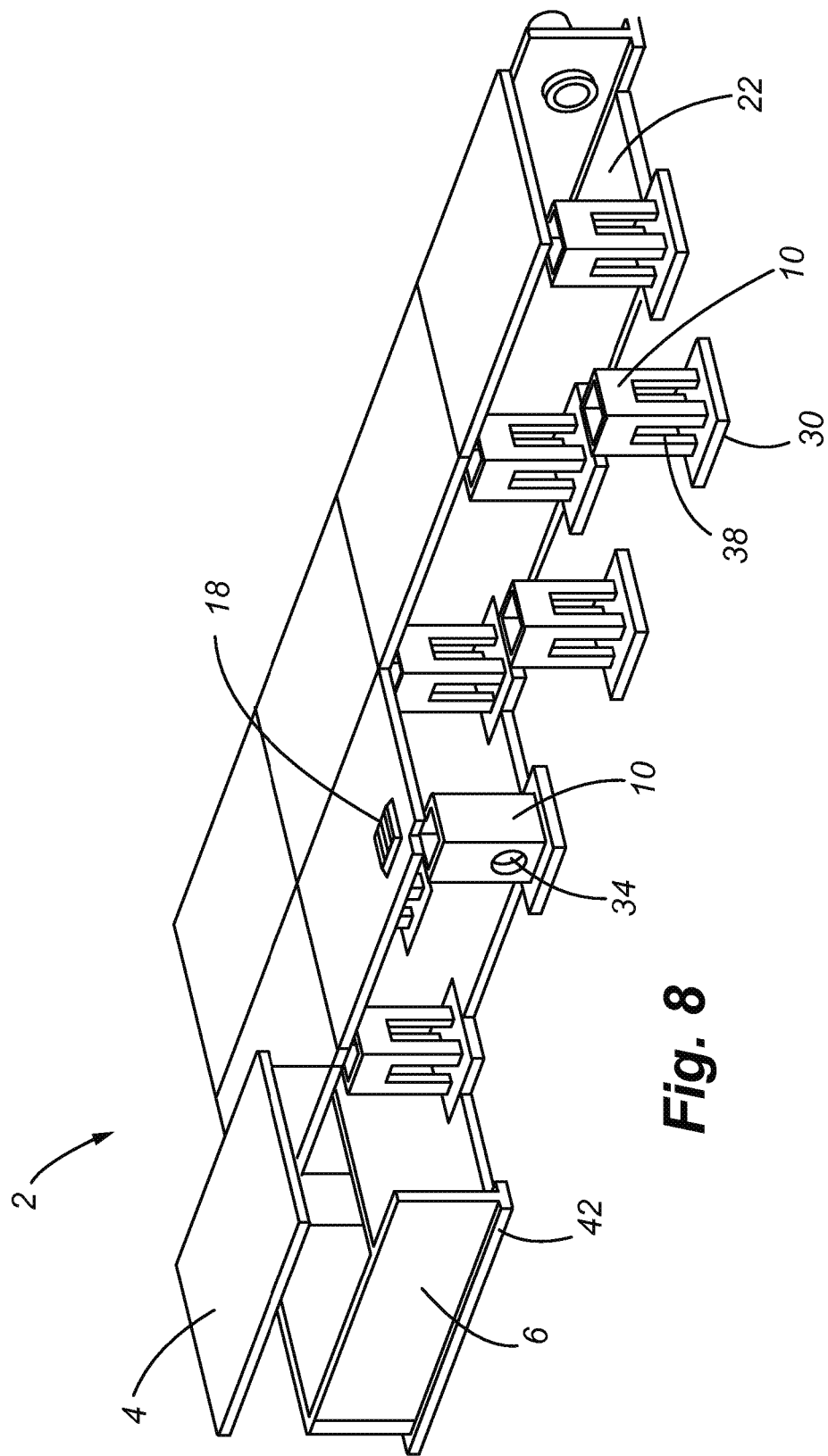
FIG. 8 is a partial perspective view of the storm water vault of another embodiment of the present invention.

The storm water vault 2 depicted in FIG. 1 includes a plurality of interconnected precast walls 6 positioned on a fill material 22 such as graded soil or gravel. The assembly shown may also rest on a non-permeable surface as shown in FIG. 8. The columns 10 support a plurality of roof panels 14 that rest on the columns 10 and/or the walls 6. At least one wall 6 may include an inlet/outlet 26 to allow fluid to ingress and egress depending on the application. The roof panels 14 in one embodiment of the present invention are made of a composite design that receives poured concrete and comprises a driving surface. Thus, the roof panel 14 may be configured to handle traffic loads with or without the incorporation of gravel, concrete or paved surfaces.

Figure 2:
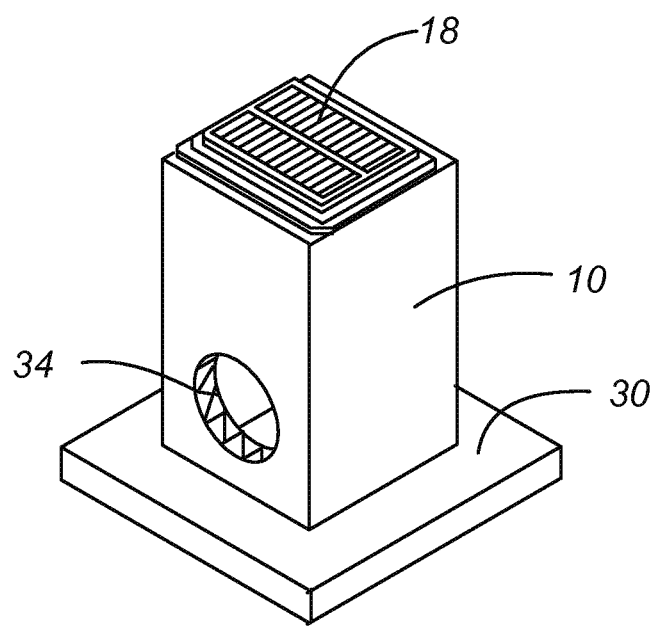
FIG. 2 is a perspective view of a column employed by the storm water vault shown in FIG. 1.

FIGS. 2 and 7 show columns 10 that depict alternative embodiments of the present invention. More specifically, the columns 10 are generally supported by a base 30 that is designed to rest on the gravel or soil surface, i.e., "fill" 22. The column 10 shown in FIG. 2 is substantially hollow wherein the grate 18 is positioned on an upper end to allow the ingress and egress of water from above the grate 18, into the column 10, out of a column outlet 34 and into the water containment system. The column 10 of FIG. 7 additionally includes a plurality of openings 38 that allow the flow of fluids therethrough. Although a prismatic column is shown, one skilled in the art will appreciate that many other shapes of columns may be employed without departing from the scope of the invention. Furthermore, the column 10 may include an integrated water treatment device such as a particulate filter.

Figure 3:
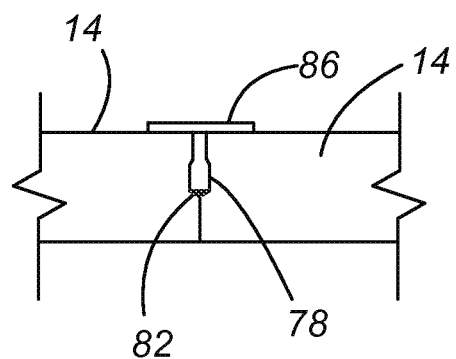
FIG. 3 is a front elevation view of the storm water vault showing the interconnection of two adjacent roof panels.

Referring now to FIG. 3, the interconnection of adjacent roof panels 14 is shown. Roof panels 14 in one embodiment include channels 78 that abut to provide a cavity for the receipt of grout 82 or other sealant. Additionally, a wrap 86 may be applied to the joint to prevent the ingress of water, which could damage the vault if frozen.

Figure 4:
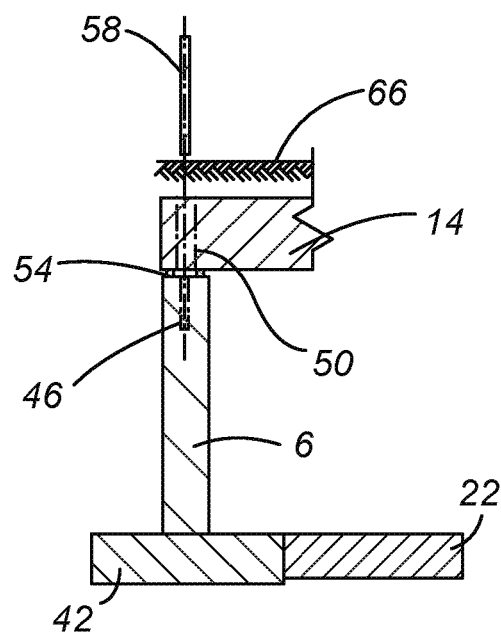
FIG. 4 is a sectional view showing the interconnection of a roof panel of the storm vault to a wall thereof.

Referring now to FIG. 4, a wall 6 of one embodiment of the present invention is shown. The wall 6 includes a footer 42 that rests on the fill 22 or adjacent thereto. Preferably, the fill 22 is comprised of pea gravel or other granular material. Embodiments of the present invention, however, may also employ a filtering fill with varying sizes of gravel or rock material to selectively control the relative permeability of flow therethrough. The walls 6 of some embodiments of the present invention may include a tapped hole 46, i.e., blind-hole associated with an upper edge thereof. The tapped hole 46 is designed to align with a thru-hole 50 provided in the roof panel 14 to receive a dowel 58. Seal members 54 may also be placed between the roof panel 14 and the wall 6. The dowel 58 is comprised of a rigid material such as re-bar, is then placed located in the thru-hole 50 of the roof panel 14 and into the tapped hole 46 of the wall 6. The dowel 58 substantially prevents translational motion between the roof panel 14 and the wall 6. A sealant 62 may also be applied to the thru-hole 50 to secure the dowel 58 in the tapped hole 46. After the dowel 58 has been placed, the assembly is brought to finish grade by the addition of an overlay 66. The thru-hole 50 may employ a female insert that is cast into the wall 6 or roof panel 14. The female insert is designed to receive a male, threaded portion of the dowel 58 to provide a continuous structural connection. In addition, the dowel may be of such a length to extend above the roof panel 14 for interconnection to rebar of the sidewalk or other surface positioned above the vault 2. This configuration provides additional manufacture and assembly tolerance.

Figure 5:
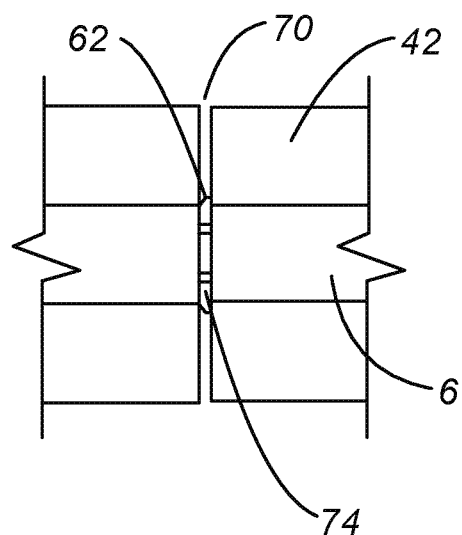
FIG. 5 is a top elevation view showing the interconnection of two adjacent walls.

Referring now to FIG. 5, a joint 70 defined by two adjacent walls 6 is shown. Here, two adjacent walls are brought together and spaced by at least one rod 74. Thereafter, a sealant 62 is injected between the walls 6 to create a generally water tight structure.

Referring now to FIGS. 6-8, one embodiment of the invention similar to that shown in FIGS. 1-5 is provided. Here, a plurality of columns 10 employ an opening 38 that facilitates the multi-directional flow of fluid. The columns 10 shown also are cost effective such that less concrete is needed to create a vault 2. Further, the nature of the columns 10 allows the storage of additional fluid. Preferably, the column bases 30 rest on a fill material 22, such as gravel. Alternatively, as shown in FIG. 8, a non-permeable material, such as concrete, may be used instead of fill and placed adjacent to the column bases 30.

Figure 9:
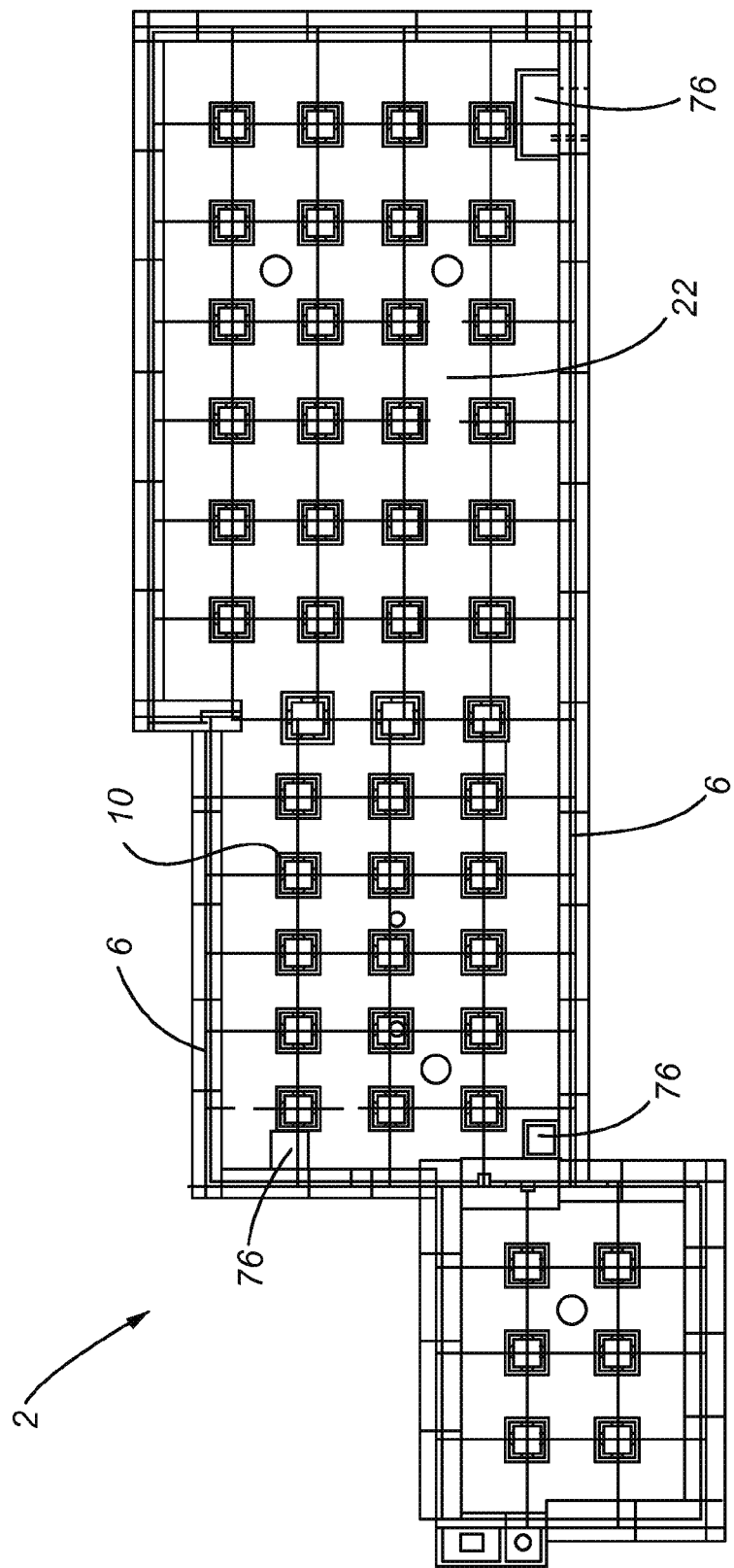
FIG. 9 is a top plan view of the storm water vault of embodiments of the present invention.
Figure 10:
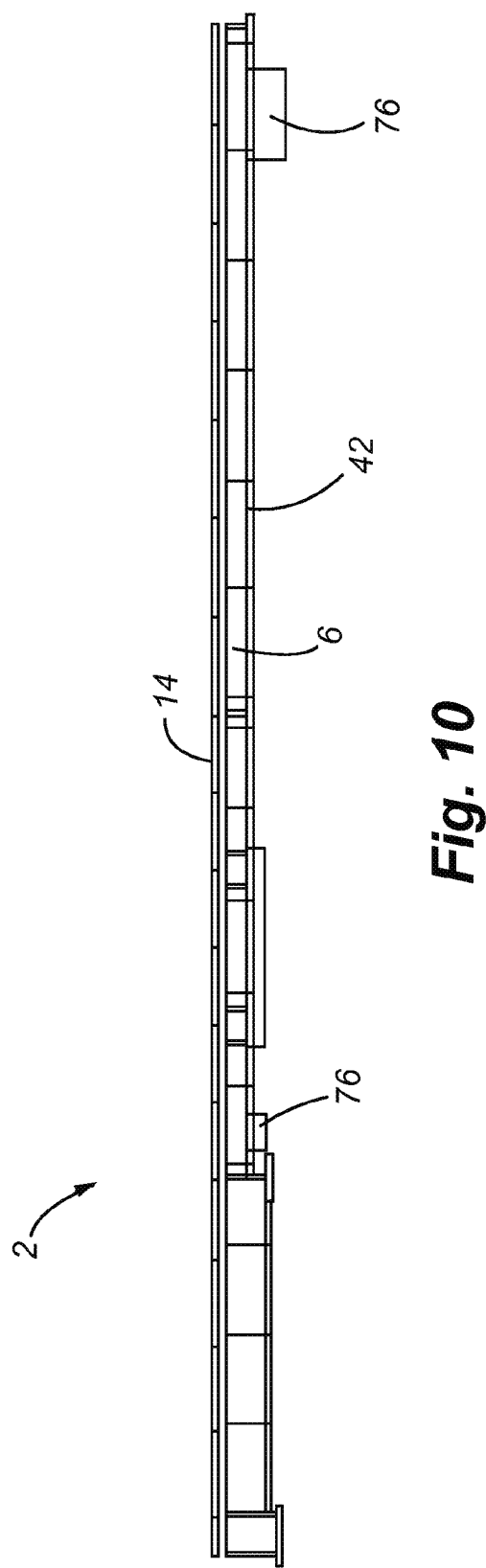
FIG. 10 is a side elevation view of the storm water vault of embodiments of the present invention.

Referring now to FIGS. 9 and 10, a storm water vault 2 of one embodiment of the invention is shown. The vault 2 may include at least one sump 76. The walls 6 of the vault 2 define a storm water storage volume.

Referring now to FIGS. 11-13, yet another embodiment of the present invention is shown. More specifically, a wall 6 having a footer 42 defines a water containment volume of the storm water vault 2. A plurality of roof panels 14 is added to a top surface of the wall 6. The roof panels 14 are also joined to the wall via a retention pin or dowel 58 that is placed in a thru-hole 50 provided in the roof panel 14 and a tapped hole 46 positioned in the wall 6. Fill 22 also may be used within the containment volume provided by the wall 6. In addition, overlay 66 may be added above the roof panel 14 to conceal the storm water vault 2. The roof panels 14 may also include a grate 18 or other opening that allows the ingress of water. Furthermore, the roof panel 14 may include at least one lift point 90 to facilitate the transportation and placement of the roof panels 14.

Figure 14:
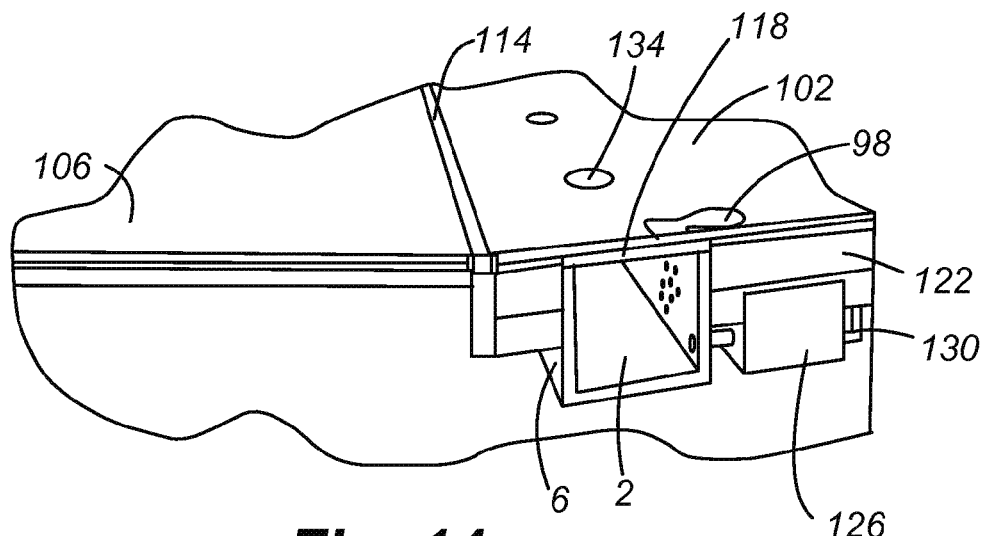
FIG. 14 is a cross-sectional perspective view of a system for capturing, storing, treating and distributing storm water of one embodiment of the present invention.
Figure 15:
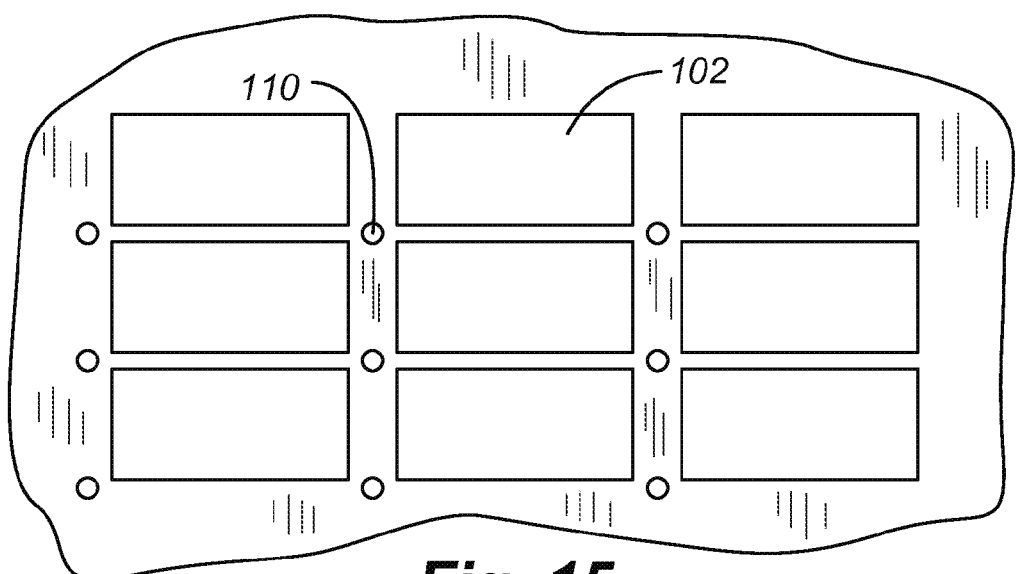
FIG. 15 is a is a partial top plan view of FIG. 14, showing the permeable surface structure of one embodiment of the present invention.

Referring now to FIGS. 14 and 15, a system for capturing, storing, and distributing storm water 98 in another embodiment of the present invention is shown. More specifically, water 98 is collected from both permeable 102 and non-permeable 106 (i.e., asphalt) surfaces. For example, the storm water system of the present invention may collect storm water 98 from non-permeable structures 106, such as parking lots, rooftops, sidewalks, and paved streets. Moreover, embodiments of the present invention are integrated into and under a commercial parking lot that includes a permeable surface structure 102 and a sub-surface storm water vault 2.

The permeable surface structure is specifically shown in FIG. 15 and comprises a plurality of permeable pavers 102 and a plurality of weep holes 110. The permeable pavers 102 transport the storm water from the surface to the sub-surface vault 2. As the storm water passes through the permeable pavers 102 the water will be captured inside the vault 2 below. The permeable pavers 102 may be made of any material that is permeable to water, such as porous concrete, plastic, gravel, or other permeable hardscape flooring material. One of skill in the art will appreciate that any size or shape of permeable paver may be utilized for this purpose. In the embodiment shown, weep holes 110 are employed to facilitate water drainage between adjacent pavers. One of skill in the art will appreciate that any number of permeable pavers 102 and weep holes 110 may be utilized and configured depending on a variety of factors, such as amount of rain fall, surface size, and aesthetics. One skilled in the art will also appreciate that other permeable overlays may be employed to transport storm water to the vault.

In one embodiment of the present invention, a surface grate 114 is also employed to capture and remove excess or run-off storm water. The grate 114 is provided to facilitate the transport of storm water into the vault 2 via an inlet positioned beneath the drainage pipe (not shown) that is interconnected to the vault 2. As the storm water encounters the grate 114, the water is channeled into the drainage pipe and then transported and deposited into the vault 2. Thus, when there is substantial surface water, such as during a heavy rain storm, the grate 114 captures any excess surface storm water not absorbed by the permeable pavers 102 and/or a permeable lid 118. Embodiments of the present invention also employ multiple surface grates 114 to enhance the water collection capability of the system. A network of interconnected grates may also be used to filter debris from the storm water.

Referring again to FIG. 14, the sub-surface storm water vault 2 is comprised of a plurality of exterior walls 6 and a permeable lid 118 that form a compartment capable of capturing and retaining storm water 98. The permeable lid 118 is supported by the plurality of exterior walls 6. One skilled in the art will appreciate that the permeable lid 118 may be selectively interconnected to the external walls by any number of securing mechanisms. The vault 2 is positioned generally vertically below the permeable surface structure 102. Thus, in one embodiment of the present invention, the vault 2 is positioned underground. However, one skilled in the art will appreciate that the vault 2 could also be positioned partially underground. Overlay 66, such as pavers, dirt, gravel, or asphalt may be placed above the permeable lid, thereby concealing the vault 2. As water flows through the permeable pavers 102 and through the permeable lid 118, the storm water enters into and fills the vault 2. The storm water system may also include permeable base members 122 surrounding the vault to facilitate the transport of storm water into the vault.

In one embodiment of the present invention, the storm water system employs a water treatment mechanism 126. The water treatment mechanism 126 may be comprised of an interconnected treatment tank. One of skill in the art will appreciate that any number of connecting devices, such as piping or other tubing, may be used to interconnect the vault 2 to the treatment tank 126. After water drains from the surface through the permeable structures 102 and into the vault 2, it is preferably transported through appropriate piping into a treatment tank 126. In one embodiment, the treatment tank 126 includes a separator to separate fluid and oil and any particulate matter. It is envisioned that once separated, the oil will be compartmentalized for storage and/or removal. The storm water system may also include a particle separator for removing debris and suspended particles from the storm water. The storm water system may additionally include one or more filtration devices or water treatment apparatus. One of skill in the art will appreciate that different separators and filters may be utilized to treat and remove pollutants, chemicals, fertilizers, sediment, and oils from the storm water depending on individual system requirements.

The storm water system may also include additional water quality treatment devices, such as hydrodynamic devices, SorbFilters™, Jelyfish™ filters, sand filters, coalescing plate oil water separators, baffle style oil water separators, and other treatment devices known in the art. It is envisioned that the water treatment and/or quality devices may be included elsewhere within the storm water system. It is also envisioned that such water treatment and/or quality devices be integrated into the system so that the water flowing into the vault is treated prior to filling the storm water vault.

Embodiments of the present invention employ a distribution mechanism to distribute the storm water for a variety of end uses. The distribution mechanism may include a storage tank, a centrifugal pump, and corresponding piping to transport the water to a second or third location. In one embodiment of the present invention, a reuse line 130 is provided to transport water from the storage tank 2 to a destination where the water will be used, such as a garden center or municipal water line. A centrifugal pump is provided to pump the water out of the storage tank 2 and into and through the reuse line(s) 130. It is envisioned that the reuse line(s) 130 will provide water to a variety of end uses, such as irrigation, landscaping, horticulture and/or agriculture, emergency fire protection, and municipal water sources. Importantly, unlike prior art storm water systems where the storm water is disposed of, the present invention stores and utilizes the storm water for multiple future uses. The storm water system of the present invention provides a system for low impact development, promotes water sustainability, and provides a viable source of reusable water.

Further, one embodiment of the present invention includes manholes 134, or other limited access openings, that selectively provide access to the internal portion of the storm water system. The manholes 134 facilitate the access of personnel and equipment and provide access to the system for cleaning, equipment installation, maintenance, and repairs. Underground access is governed by Occupational Safety & Health Administration regulations under confined space guidelines.

Figure 16:
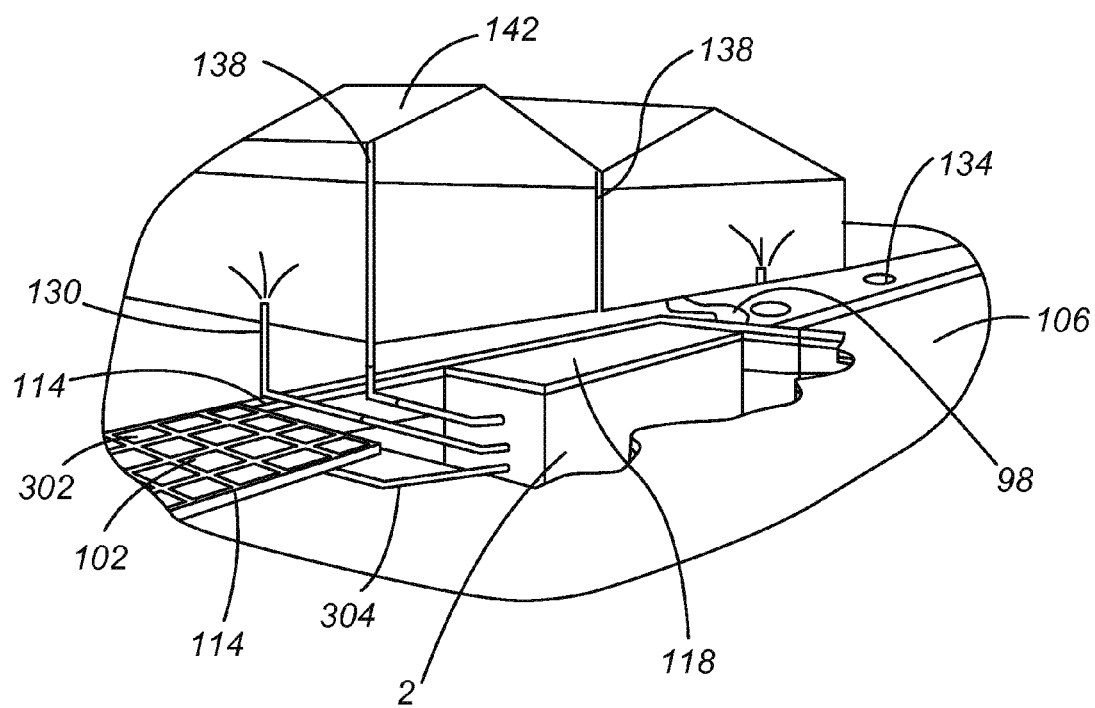
FIG. 16 is a partial perspective view of a system for capturing, storing, and distributing storm water of another embodiment of the present invention.

Referring now to FIG. 16, another embodiment of the present invention is shown. This embodiment of the present invention is very similar to that previously described such that the storm water system is comprised of a permeable surface structure 102 and a sub-surface storm water vault 2 that are integrated into a commercial parking lot. In this embodiment of the present invention, a plurality of downspouts 138 are employed to capture storm water from above-surface structures, such as a roof 142. The downspouts 138 facilitate the removal and collection of storm water and are positioned along an above-surface structure and are interconnected to the storm water vault 2 via piping and/or tubing. The downspouts 138 reduce the amount of overhead storm water runoff and increase the amount of reusable water collected. In the embodiment shown, the storm water vault, treatment tank, and storage tank are contained within a single underground housing compartment.

Figure 17:
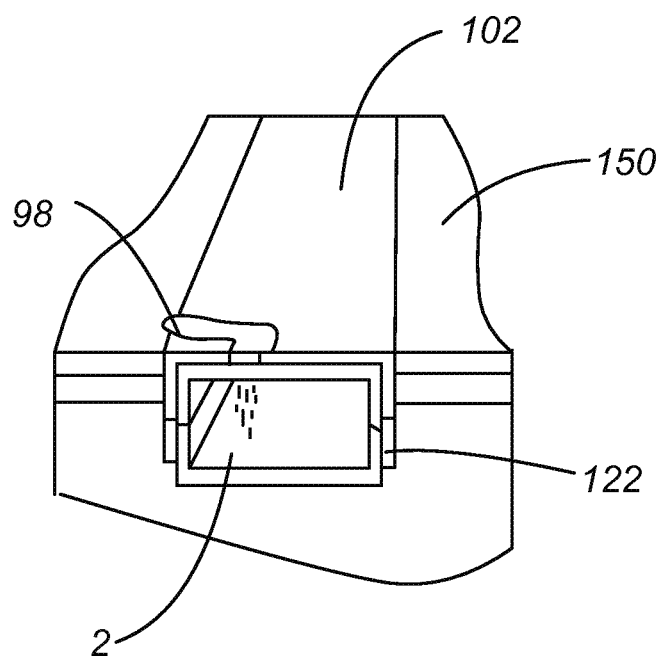
FIG. 17 is a cross-sectional perspective view of a system for capturing, storing, and distributing storm water of another embodiment of the present invention.

Referring now to FIG. 17, yet another embodiment of the present invention is shown. More specifically, the storm water system is integrated into a crosswalk 150 or other roadway. The embodiment shown includes a permeable surface 102 structure and sub-surface storm water vault 2. One skilled in the art will appreciate that the afore-mentioned features can be sized appropriately for positioning below a crosswalk 150 or other roadway in order to accommodate other sub-surface devices such as water, gas, and electrical lines.

FIGS. 18-21 show another embodiment of the present invention that employs permeable modules 154 that are generally comprised of a roof panel 158 and associated sidewalls 162. To permit fluid to enter the module 154, roof panel 158 and/or the sidewalls 162 include flow ports 166, i.e., openings or slots. The flowports 166 may be generally conical having a narrow opening 168 at a top surface 170 of the roof panel 158 and a wide opening 172 at a bottom surface 174 of the roof panel 158. In one embodiment of the present invention, the upper opening 168 is generally elliptical having a major axis of about four inches and a minor axis of about one inch. Further, window openings 178 may be provided in the sidewalls 162 that have a major dimension of about six inches and a minor dimension of about three inches. As one skilled in the art will appreciate, flow ports of various configurations and number may be provided. Further, the flow ports in the roof panel 158 and the sidewalls 162 (if applicable) may be of different configurations.

Figure 21:
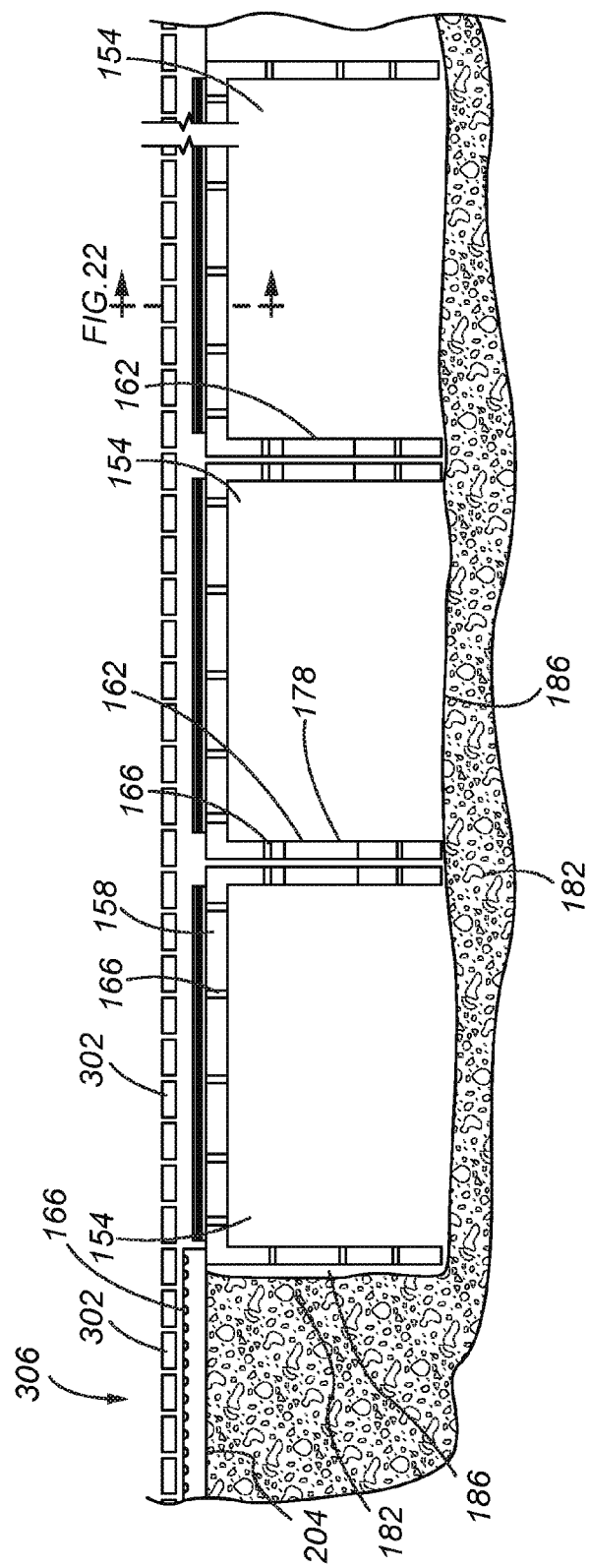
FIG. 21 is an elevation view of a system of one embodiment that is generally comprised of a series of modules.
Figure 22:
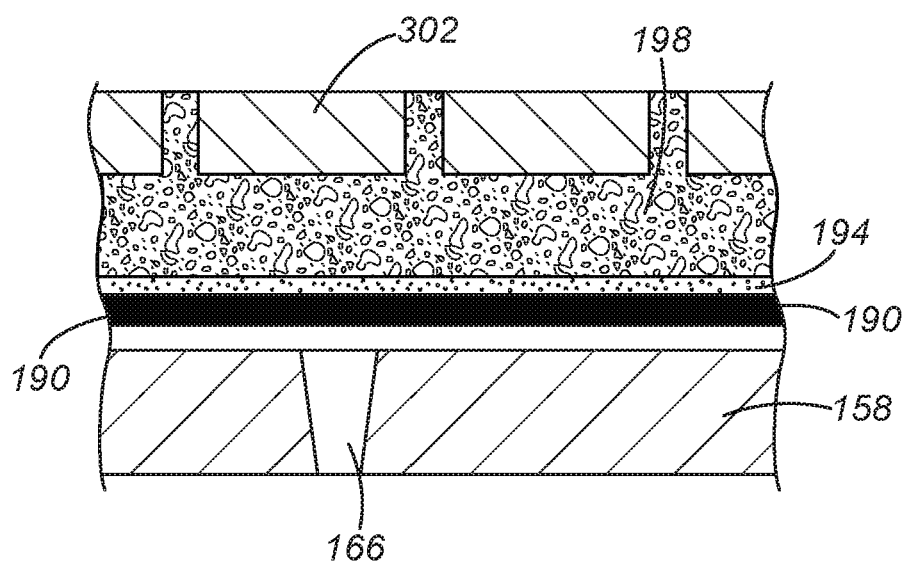
FIG. 22 is a partial cross sectional view of FIG. 21.

Referring now specifically to FIGS. 21 and 22, an assembly of modules 154 is provided. Here, a plurality of modules 154 are placed side-by-side and/or end-to-end wherein the flow ports 166, which are integrated into the sidewalls 162, are aligned to allow flow of fluid through the system. As shown, all of the modules 154 include flow ports 166 through their roof panels 158 and sidewalls 162. In operation of various embodiments, the modules 154 rest on a foundation of #57 stone 182, which comprises aggregate of about ¾ to 1 inch in diameter. Optionally, the modules rest on a geotextile casing material 186 that also may be used to encase all or a portion of the assembled modules 154. The casing material may also be positioned above a portion of the assembled modules. The #57 stone 182 is also placed on the sides of the outer boundaries of the assembly. Some embodiments of the present invention incorporate a layer of drainage-enhancing medium, such as Flo-Cell® 190 manufactured by Atlantis, to enhance horizontal water flow into the flow ports 166, but this is not a necessary feature. On top of the Flo-Cell® (if applicable), a filter fabric 194 is used to help prevent bedding and fine material from falling through the flow ports 166. Next, a layer of #8 aggregate 198, which comprises stones of about ¼ to ½ inch diameter, is placed on the filter fabric 194. Finally, a series of permeable pavers 302 is placed on top of the #8 gravel or other aggregate 198. In one embodiment of the present invention, the modules rest on about a five-inch thick layer of #57 gravel or stone 182. Further, at the limits of the modules, the pavers may continue for a certain distance supported by the #8 and #57 stone. In one embodiment of the present invention, the modules are comprised of clamshell style modules that are at least partially wrapped with an impermeable liner at least over bottom and side portions thereof. In various embodiments, one or more permeable pipes 204 are employed to transmit water to a system or a module 154. Permeable pipes 204 may be provided in combination with, such as positioned below, permeable pavers 202. For example, fluid may be collected from a walkway comprising permeable pavers 202 which does not comprise modules 154 or vaults directly underneath, and the fluid conveyed to such additional system components by a pipe or submerged conduit that is at least partially permeable. Permeable pipes comprise flow ports 166 as shown and described herein and/or other suitable means for transmitting fluid. Permeable pipes, in various embodiments, direct water to an upper or roof portion 158 of a module 154 or, in alternative embodiments, are directly routed or connected to an inner volume of a module 154.

During use and implementation of embodiments of the present invention, water from rain or other sources flows on an outer surface of the pavers and through spaces between the pavers or apertures therethrough. The water then filters through the aggregate 198 and the filter fabric 194. The water then comes into contact with the Flo-Cell® material 190 (if applicable), contacts the roof panel 158, and flows through various flow ports 166 integrated into the roof panel 158 and/or sidewalls 162. Again, a casing material 186 may be employed such that the water is trapped within the module 154 to be used later.

FIGS. 23-26 depict various embodiments of modules 154 comprising flow ports 166 on at least a roof panel 158 of the module 154. Window openings 178 may be provided with or without window features 180 depending upon whether the window opening 178 is intended to act as a portal or be sealed to fluid flow. Accordingly, window openings 178 are shown as being provided with an without window features 180 in various embodiments. The figures, particularly in this regard, should not be viewed as limiting the present disclosure to any particular arrangement of open or sealed window openings 178.

Figure 23:
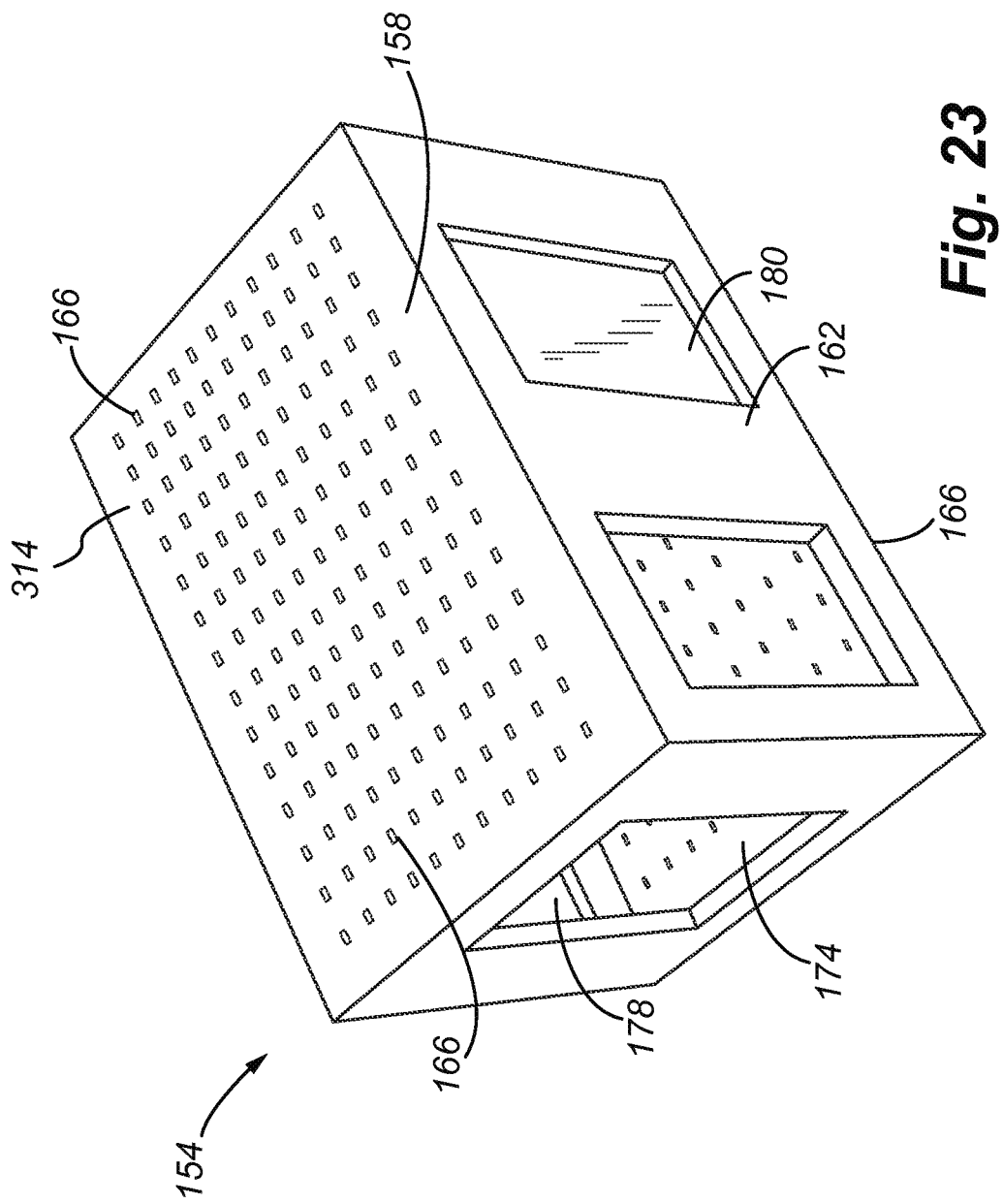
FIG. 23 is a perspective view of a module according to one embodiment.
Figure 24:
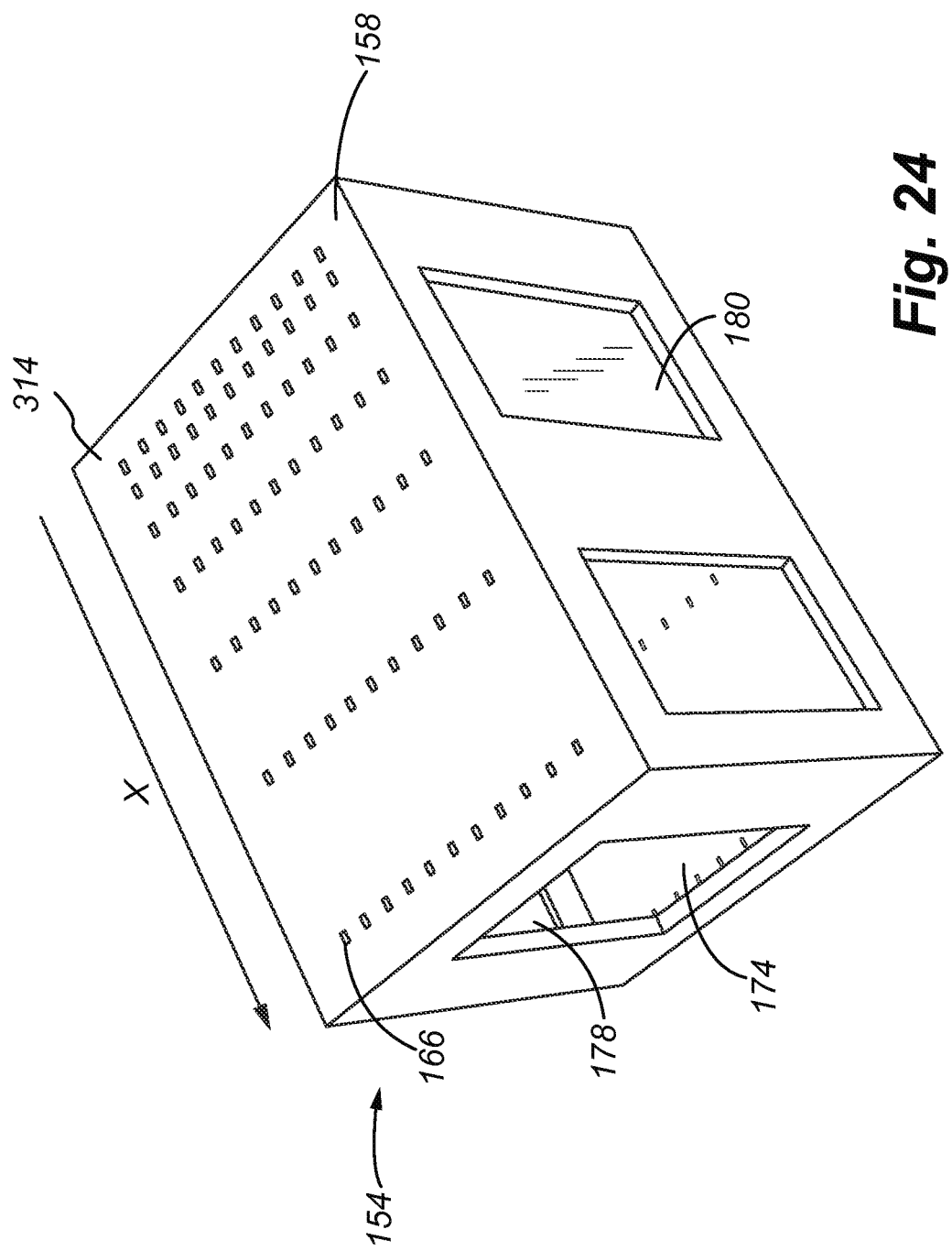
FIG. 24 is a perspective view of a module according to one embodiment.
Figure 26:
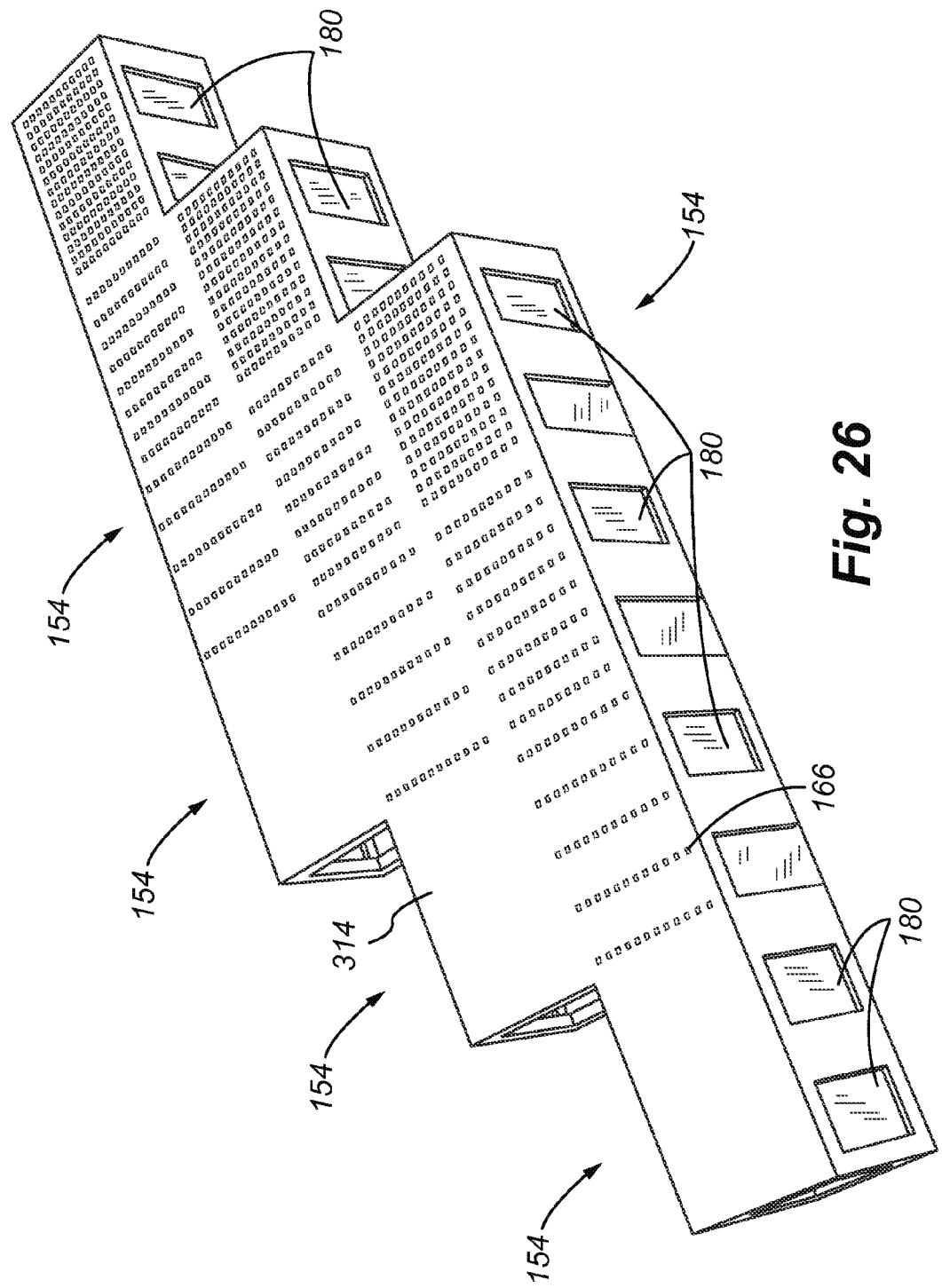
FIG. 26 is a perspective view of a combination of a plurality of modules according to one embodiment.
Figure 27:
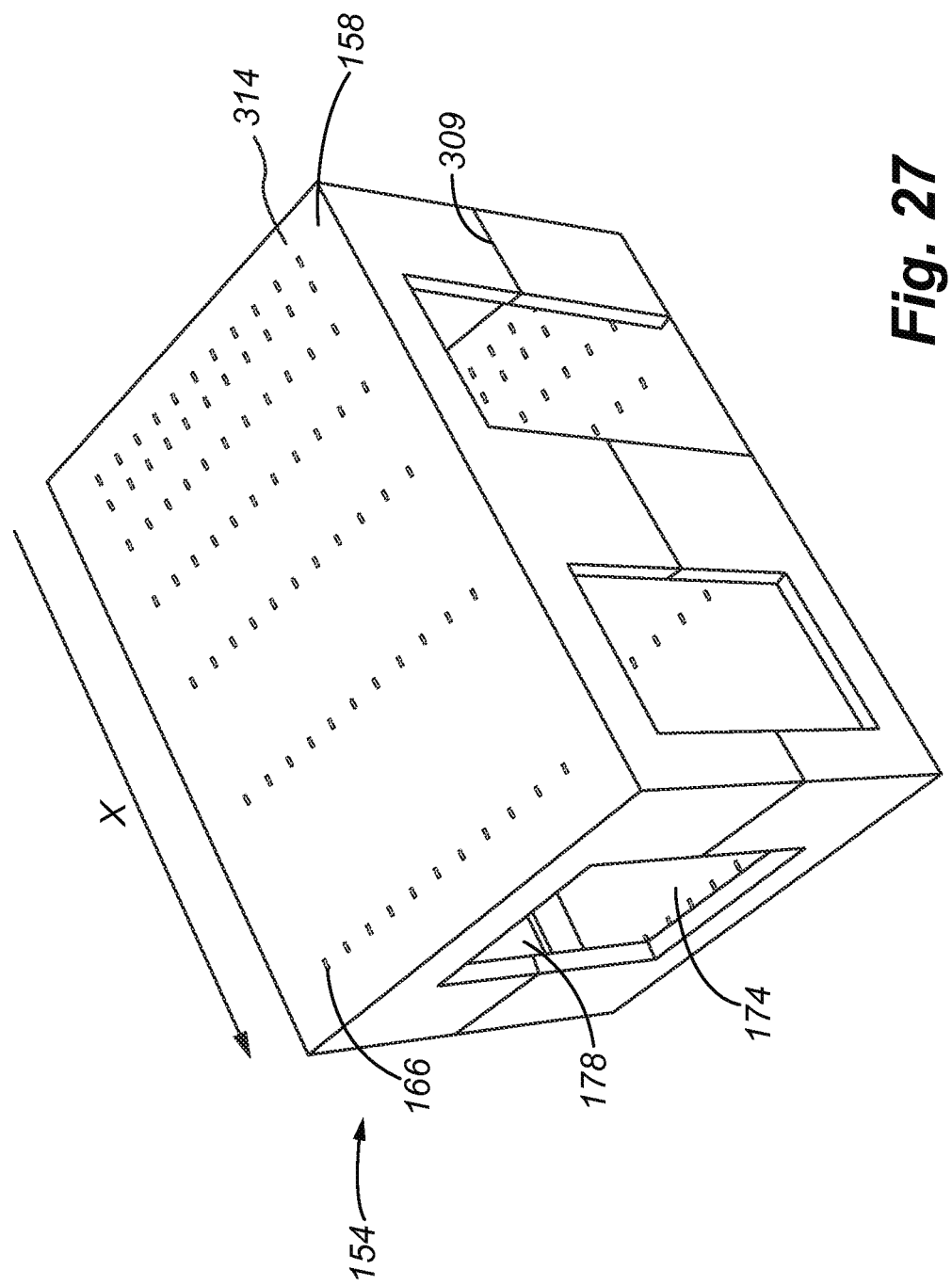
FIG. 27 is a perspective view of a module according to one embodiment.

FIG. 23 is a perspective view of a module 154 according to one embodiment wherein a roof panel 158 and a bottom surface portion 174 of the module comprise a plurality of flow ports 166. As shown, a module is provided comprising an 11×14 grid of flow ports 166. It will be expressly understood, however, that modules may be provided with any number, spacing, and/or arrangement of flow ports 166. For example, an evenly spaced grid of ports 166 may be provided in various densities, such as the 11×14 arrangement shown in FIG. 23, an 8×11 arrangement, a 5×12 arrangement, etc. Additionally, and as shown in FIG. 24, a grid of flow ports 166 may be provided such that the grid is not evenly spaced. The module 154 of FIG. 24 provides a non-uniform grid of 11×7 flow ports 166. As with uniform grids of the present invention, non-uniform grids provided on modules 154 are not limited to any particular number, spacing, or arrangement of ports 166. The embodiment provided in FIG. 24 comprises rows of flow ports 166 expanding in linear spacing along the indicated X direction. It will further be recognized that although flow ports 166 are depicted as being generally arranged in even rows, the present disclosure is not limited to the same. Indeed, it is contemplated that a module 154 may comprise a plurality of ports 166 arranged in a wide variety of patterns, including a generally random order. Openings 178 may be provided as window openings or, in various embodiments, as "door" openings wherein the opening extends downwardly to a bottom portion of the module. FIG. 27 depicts a module comprising both window and door openings employed in a single module. It will be expressly recognized that openings 178 of the present invention are not limited to a particular geometry or dimensions and, furthermore, that modules 154 of the present disclosure are not limited to comprising any particular opening or combination of openings. FIG. 26, for example, depicts an embodiment wherein a combination of window and door openings is provided.

Figure 25:
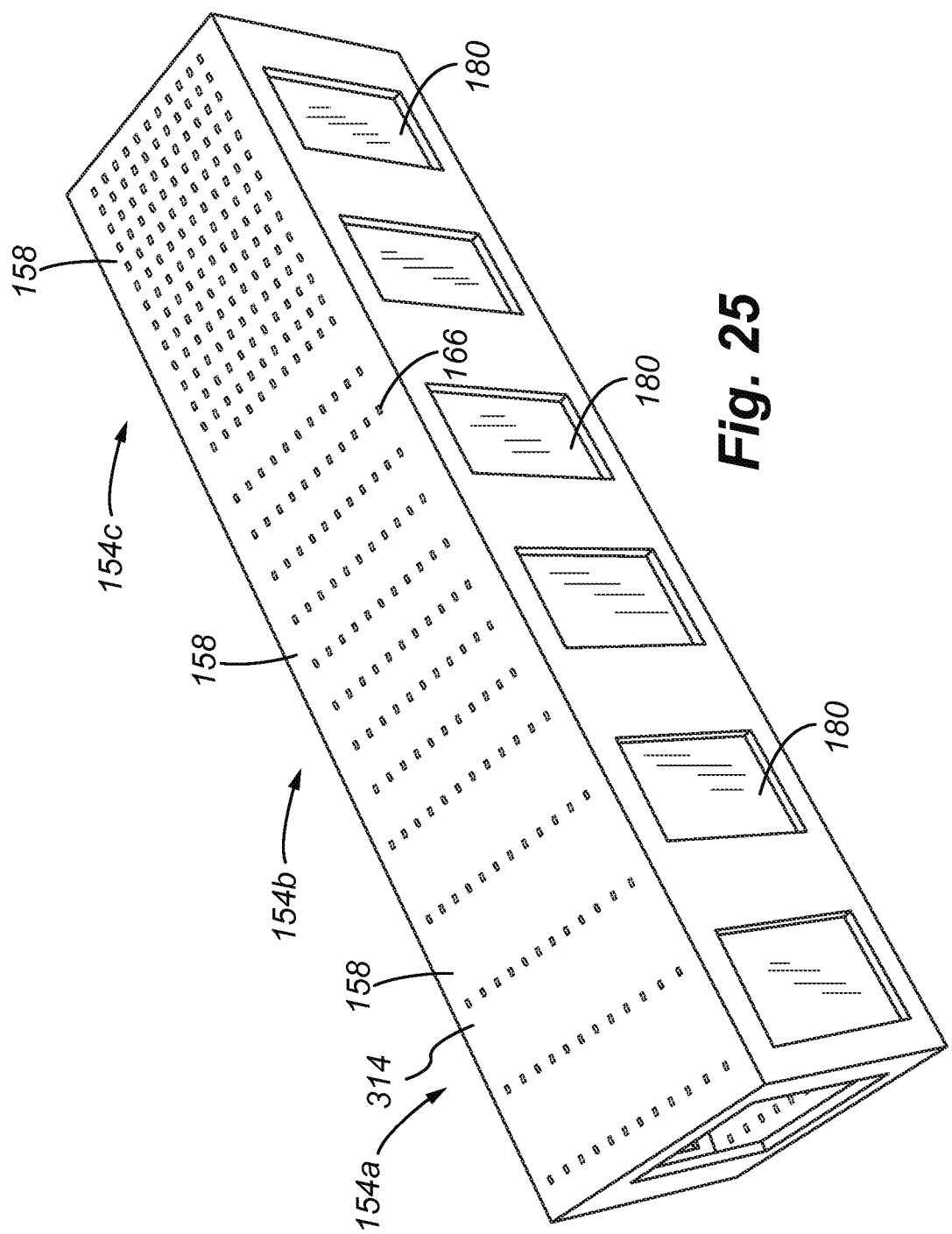
FIG. 25 is a perspective view of a combination of a plurality of modules according to one embodiment.

FIG. 25 is a perspective view of a plurality of modules 154a, 154b, 154c arranged sequentially to provide a plurality of flow port patterns along a length of the combination of modules. FIG. 26 is a perspective of a plurality of modules as shown in FIG. 25 placed laterally adjacent to one another. By combining a plurality of modules 154 of the same or different flow port patterns in various directions and orientations, a wide variety of overall flow port 166 patterns as well as a wide variety of water collection goals may be accomplished.

FIG. 27 is a perspective view of a module 154 according to one embodiment wherein the module is comprised of upper and lower portions connected about union 309. In FIG. 27, union 309 is provided about a centerline of the constructed module 154, but need not be so positioned. The assembled module 154 of FIG. 27 comprises a "clamshell" assembly whereby two module portions of substantially the same size and dimension are stacked or assembled to form the final module 154.

Figure 28:
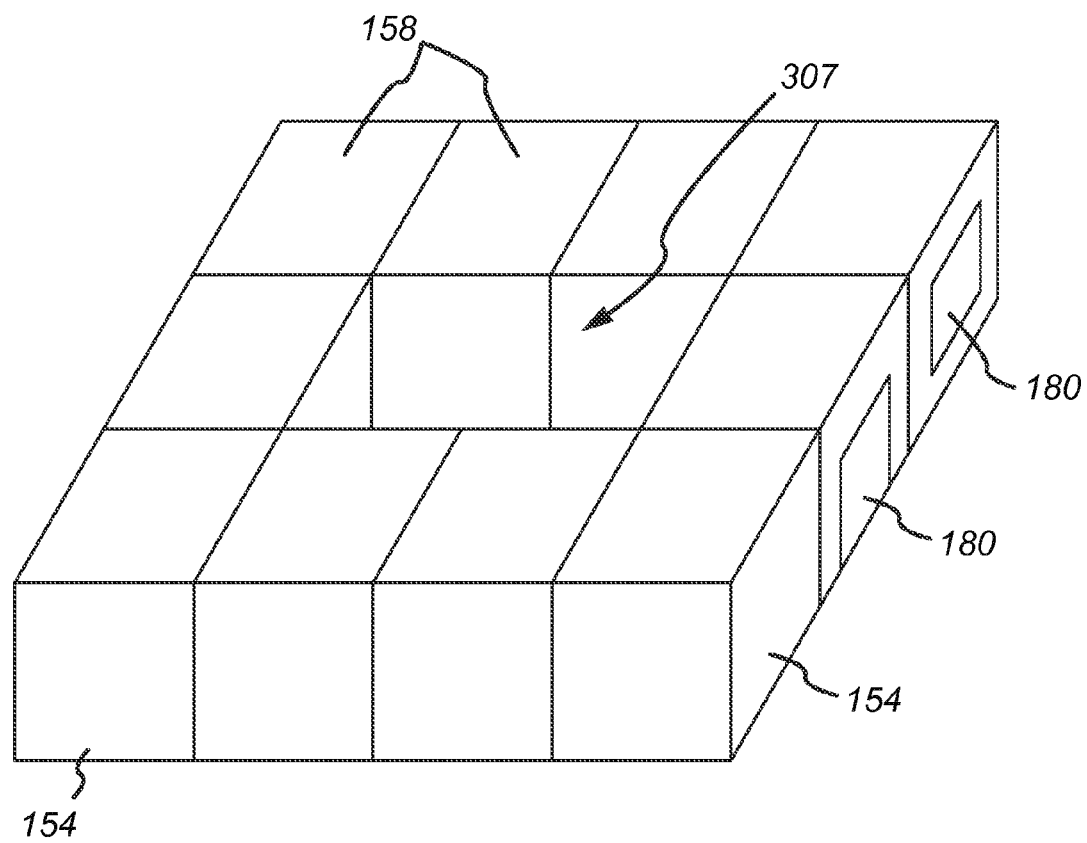
FIG. 28 is a perspective view of a fluid containment system according to one embodiment.

FIG. 28 is a perspective view of one embodiment wherein a plurality of modules 154 is provided, wherein the plurality of modules 154 surrounding a void 307 area. Void area 307 is provided in various embodiments for fluid storage, material storage, provision of access to the system, and/or in order to save materials and labor. Accordingly, in various embodiments, the void 307 is in fluid communication with various surrounding modules 154. Surface treatments and features are provided above at least the void 307. Surface treatments residing directly above the void may be permeable, such as permeable pavers shown and described herein, or may be non-permeable. Such non-permeable treatments according to various embodiments serve to direct water to permeable locations, such as permeable locations in operative communications with various modules 154. While the embodiment of FIG. 28 is depicted as a substantially symmetrical square pattern comprising a centrally located void 307, the present invention is not so limited. Indeed, it is expressly contemplated that any number and pattern of void features may be provided in combination with various features shown and described herein. Void features 307 provide the ability to customize a system, increase underground storage capacity for various objects, and increase overall system efficiency, for example. Voids 307 may thus be provided in any number of desired sizes and/or configurations.

Figure 29:
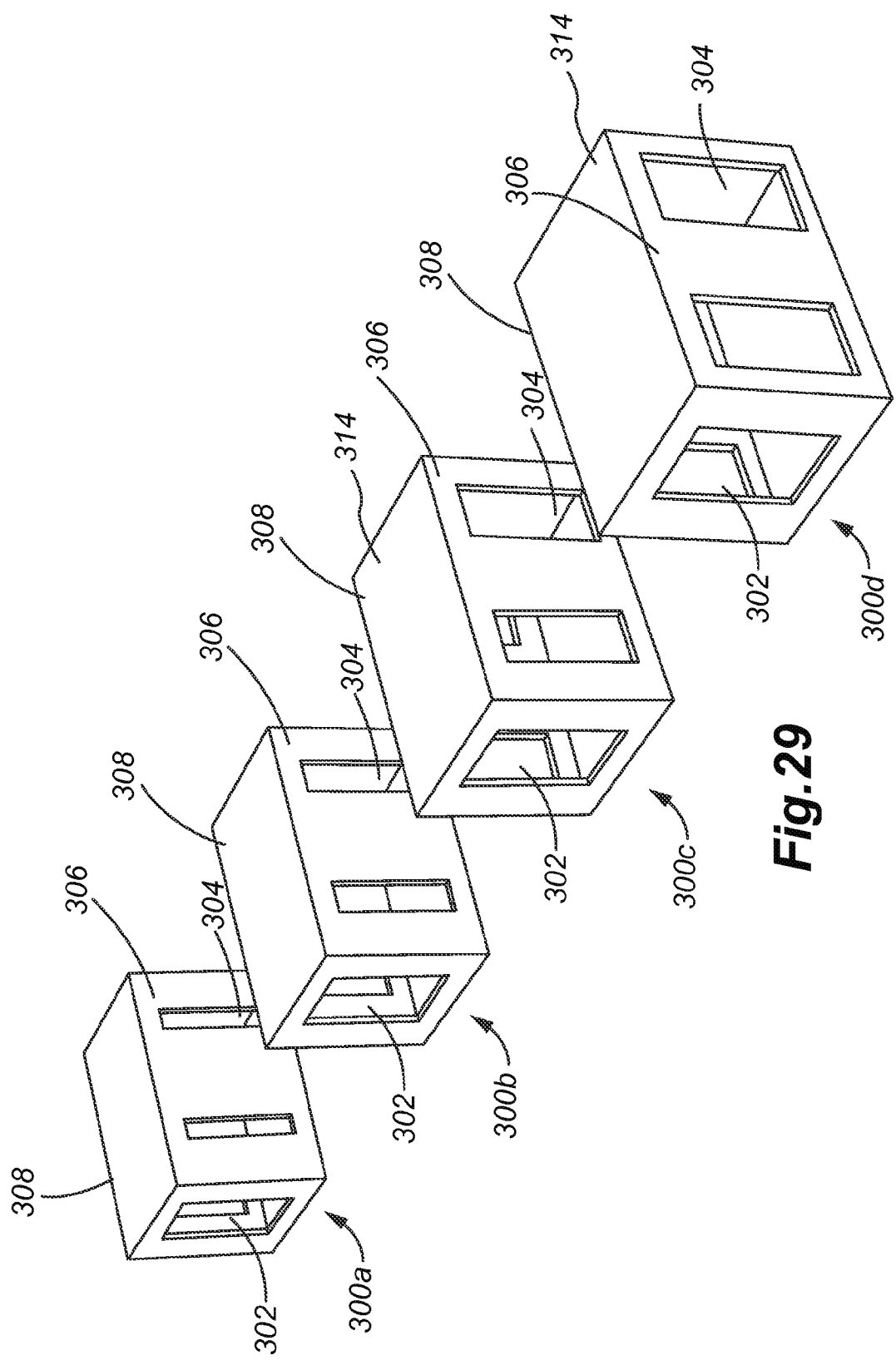
FIG. 29 is a perspective view of a plurality of modules according to one embodiment of the present invention provided in an unassembled state.

FIG. 29 is a perspective view of various modules 300a, 300b, 300c, 300d. The modules 300 comprise side windows 302. The modules further comprise flow-through ports 304, wherein each module 300d, 300c, 300b, 300a comprise successively smaller ports 304 to impact draining and flow-through characteristics when the modules 300 are provided in an assembled state. The modules 300 comprise first 306 and second 308 panels. Flow-through ports 304 are provided on first 306 and second panels 308 of each of the modules 300. An assembled state of the modules comprises providing the modules 300 adjacent to one another, such that a first side and a second side of the panels are provided in contact. By selectively reducing the size of the openings, the ingress and egress of the water through each individual module can be selectively controlled, as well as the flow rate within the entire assembly.

Figure 30:
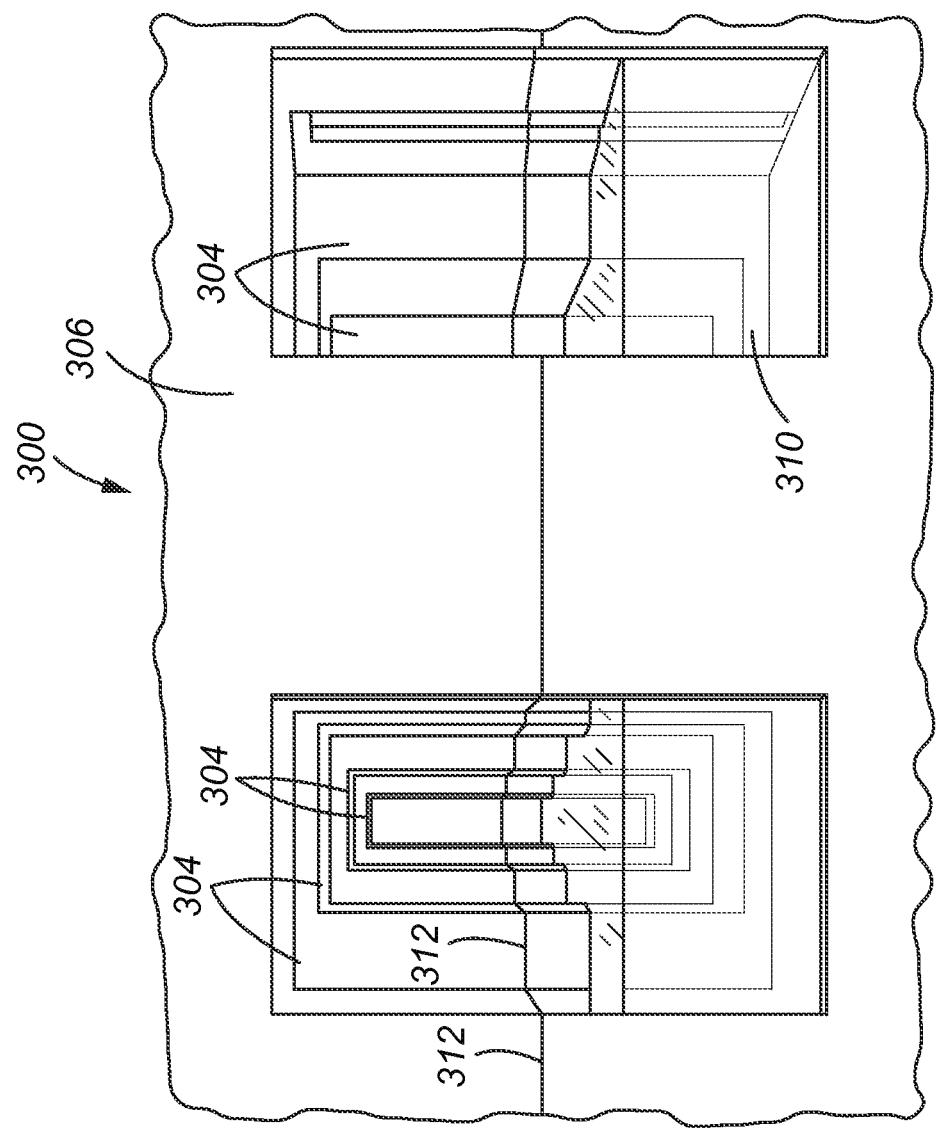
FIG. 30 is an elevation view of a plurality of modules according to one embodiment of the present invention and containing a fluid.

FIG. 30 is a side elevation view of the drainage assembly provided in an assembled state. As shown in FIG. 30, liquid 310 (e.g. water) flows into and discharges from interior volume of the assembled modules. The modules 300 of FIG. 30 may comprise an upper and lower half joined at a seam 312 as shown, or may be composed of one integral precast concrete module. The liquid 310 is allowed to flow through the plurality of modules 300 in a funneled manner at least in part due to the sequentially smaller flow-through ports 304 provided in each successive module. As used herein, "smaller" ports refers to ports having at least one dimension smaller than an adjacent port 304. In the depicted embodiment of FIG. 30, the ports 304 decrease in width from one module 300 to the next. It will be expressly recognized, however, that any one or more dimensions and shapes of the ports 304 may be varied to create a reduced flow-rate between adjacent modules. In certain embodiments, the ports 304 comprise substantially circular apertures that decrease in diameter between adjacent modules 300.

Figure 31:
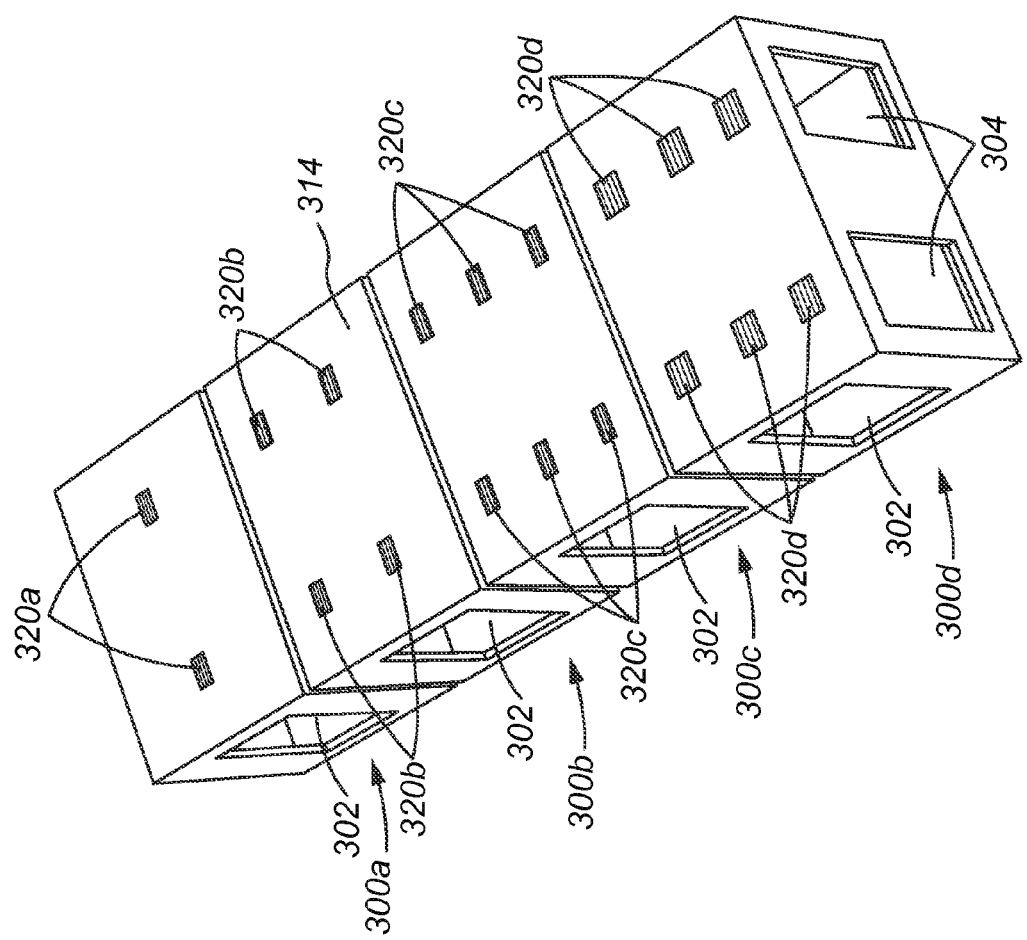
FIG. 31 is a perspective view of a plurality of modules according to one embodiment of the present invention provided in an assembled state.
Figure 32:
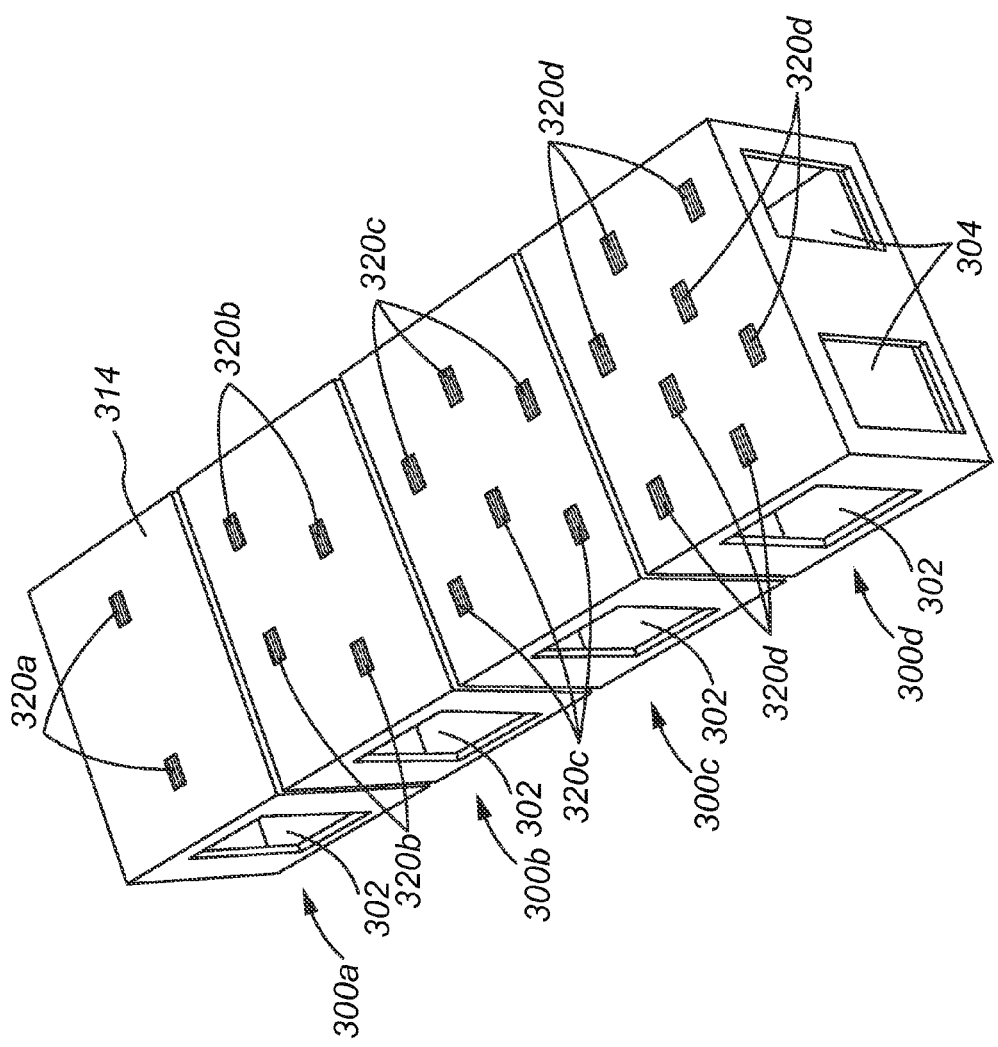
FIG. 32 is a perspective view of a plurality of modules according to one embodiment of the present invention provided in an assembled state.

FIGS. 31-32 depict various embodiments of the present invention wherein a plurality of drainage modules 300 are provided to create a water storage assembly. FIG. 31 depicts a plurality of modules 300a, 300b, 300c, 300d wherein the modules are provided in series and comprise at least a longitudinal flow path for fluid to flow between the adjacent modules. The modules 300 of FIG. 31 comprise longitudinal flow ports 304 and side windows 302 or lateral flow ports to allow ingress and egress from module to module. In preferred embodiments, and as shown in more detail in FIGS. 29-30, at least one of the combination of longitudinal flow ports 304 and lateral flow ports or side windows 302 comprise successively smaller ports along the series of modules. As further shown in FIG. 31, each of the modules 300 comprise a roof portion 314 that generally defines an upper limit of the module and is preferably provided proximal to a ground surface, at least with respect to remaining portions of the module(s). Each of the roof portions 314 of the successive modules 300a, 300b, 300c, 300d comprise ports 320a, 320b, 320c, 320d, the ports comprising a grate or sieve members to prevent entrance of undesired debris and material into the module 300, but without substantially restricting the flow of fluid through a port. The provision of successively smaller roof ports and/or successively smaller longitudinal ports provide for a controlled flow of fluid through the assembly. Specifically, modules of lower permeability and/or flow rate (e.g. 300a in FIG. 31) may be provided in an area of higher drainage, such as beneath a surface or ground area that is primarily unpaved. The series of modules 300 may extend underneath areas of lower drainage, such as beneath paved surface, wherein modules of higher permeability and/or flow rate (e.g. 300d) are provided under areas of lower drainage, such as paved surface areas. Fluid may be advantageously directed and funneled by providing module assemblies as shown and described herein, and a more uniform distribution of fluid may be achieved within the assembly.

FIG. 32 depicts a plurality of modules 300 comprising an assembly, wherein each successive module comprises a plurality of ports 320a, 320b, 320c, 320d in a roof member 314. The ports of FIG. 32 are provided in an uneven or staggered distribution. Ports provided on one or more roof panels 314 of an assembly may be provided in any pattern or combination of patterns. Evenly distributed ports (e.g. FIG. 31) and/or uneven, staggered ports may be provided on any one or more modules 300 of an assembly in accordance with the present invention.

While various embodiments of the present invention have been described in detail, it is apparent that modifications and alterations of those embodiments will occur to those skilled in the art. However, it is to be expressly understood that such modifications and alterations are within the scope and spirit of the present invention as set forth in the following claims.

What is claimed is:

1. An assembly for retaining storm water beneath a ground surface comprising:
    a plurality of substantially rectilinear modules each having a substantially horizontally disposed roof portion and a plurality of vertically disposed sidewalls extending from the roof portion to define an interior volume;
    said plurality of sidewalls comprising a first pair of lateral sidewalls, said lateral sidewalls provided in a substantially parallel relationship, and a second pair of longitudinal sidewalls provided substantially perpendicular to said first pair of lateral sidewalls;
    a layer of drainage-enhancing medium positioned above said plurality of modules;
    a layer of filter fabric positioned above said drainage-enhancing medium;
    a layer of aggregate material positioned above said filter fabric, and a layer of permeable pavers positioned above said layer of aggregate material;
    said second pair of longitudinal sidewalls comprising ports to allow ingress and egress of a liquid;
    said plurality of modules being aligned in a longitudinal direction of said assembly, and each of said plurality of modules are provided in fluid communication with an adjacent module via said ports;
    wherein at least one of said modules comprises a plurality of discrete openings in said substantially horizontally disposed roof portion to allow ingress of water into said at least one of said plurality of modules; and wherein said plurality of modules are provided in series and wherein at least one of said ports of a successively adjacent module in said series comprises a port of a smaller area than a port provided in said preceding module.

2. The assembly of claim 1, wherein at least some of said second pair of longitudinal sidewalls comprise ports of a different area.

3. The assembly of claim 1, wherein said plurality of openings in said substantially horizontally disposed roof portion comprise slots that have an opening associated with an outer surface of said roof portion that is between about 1 inch by about 4 inches wide and an opening associated with an inner surface of said roof portion that is between about 3 inches by about 6 inches wide.

4. The assembly of claim 1, wherein said plurality of substantially rectilinear modules are positioned on a layer of permeable gravel.

5. A system for capturing, storing, and distributing water in a subterranean location, comprising:
- a first module comprising a substantially horizontally disposed roof portion and a plurality of vertically disposed sidewalls extending from the roof portion to define an interior volume;
- a second module comprising a substantially horizontally disposed roof portion and a plurality of vertically disposed sidewalls extending from the roof portion to define an interior volume;
- a layer of drainage-enhancing medium positioned above said modules;
- a layer of filter fabric positioned above said modules;
- a layer of aggregate material positioned above said filter fabric;
- a layer of permeable pavers positioned above said layer of aggregate material;
- said vertically disposed sidewalls of said first module comprising a first panel and a second panel;
- said vertically disposed sidewalls of said second module comprising a third panel and a fourth panel, wherein said third panel and said fourth panel are provided substantially parallel to one another;
- at least one of the first and the second panels comprising a first flow port, and at least one of the third and fourth panels comprising a second flow port, said flow ports defining a fluid flow path through at least one of the first, second, third and fourth module wherein said fluid flow path is substantially perpendicular to at least of the first and second panels;
- wherein the first flow port is larger than the second flow port;
- wherein at least one of said modules comprises a plurality of ports in said substantially horizontally disposed roof portion, said plurality of ports provided in a staggered distribution and wherein each of said plurality of ports comprises a grate; and
- wherein said first module and said second module are provided in series.

6. The system of claim 5, wherein said modules are positioned on a layer of permeable gravel.

7. A system for capturing, storing, and distributing water in a subterranean location, comprising:
- a first module comprising a roof portion and a plurality of vertically disposed sidewalls extending from the roof portion to define an interior volume;
- a second module comprising a substantially horizontally disposed roof portion and a plurality of vertically disposed sidewalls extending from the roof portion to define an interior volume;
- a plurality of permeable pavers provided above at least one of said first module and said second module;
- said vertically disposed sidewalls of said first module comprising a first panel and a second panel;
- said vertically disposed sidewalls of said second module comprising a third panel and a fourth panel, wherein said third panel and said fourth panel are provided substantially parallel to one another;
- at least two of the first, second, third and fourth panels comprising a flow port, said flow ports defining a fluid flow path through said modules wherein said fluid flow path is substantially perpendicular to at least one of the first, second, third and fourth panels;
- wherein a flow rate of said first panel is larger than a flow rate of said second panel, and the flow rate of said second panel is larger than a flow rate of said fourth panel; and
- said first module comprising a first plurality of flow ports in said roof portion, and said second module comprises a second plurality of flow ports in said roof portion.

8. The system of claim 7, wherein said first plurality of flow ports in said roof portion of said first module is greater in number than said second plurality of flow ports in said roof portion of said second module.

9. The system of claim 7, wherein said first panel comprises a greater number of flow ports than at least one of said second panel, said third panel, and said fourth panel.

10. The system of claim 7, further comprising a treatment device that removes contaminants from the water.

11. The system of claim 7, wherein said system comprises a surface structure comprising a plurality of spaced pavers with weep holes located therebetween to allow the passage of water.

12. The system of claim 7, wherein at least one of said modules comprises a first lower portion and a second upper portion, said first lower portion and said second upper portion each comprising approximately one-half of the height of the at least one of said modules, wherein said first lower portion and second upper portion are connectable about a substantially horizontal midline to form the at least one module.

13. The system of claim 7, further comprising a water permeable conduit, said water permeable conduit in operable communication with a permeable surface and at least one of said modules.

14. The system of claim 7, wherein at least one of said flow ports in said vertically disposed sidewalls comprises a selectively removable panel.

15. The system of claim 7, further comprising a third module provided in series with said first and second modules, wherein each of said modules in series comprise successively decreasing fluid permeability.

* * * * *